United States Patent Office 3,838,153
Patented Sept. 24, 1974

3,838,153
6-[α-(GUANYLUREIDOALKANOYLAMINO)
ARACYLAMINO]PENICILLANIC ACIDS
Ernest S. Hamanaka, Groton, and David S. Patton, North
Stonington, Conn., assignors to Pfizer Inc., New York,
N.Y.
No Drawing. Filed May 16, 1972, Ser. No. 253,856
Int. Cl. C07d 99/16
U.S. Cl. 260—239.1                                     11 Claims

ABSTRACT OF THE DISCLOSURE

Compounds of the formula

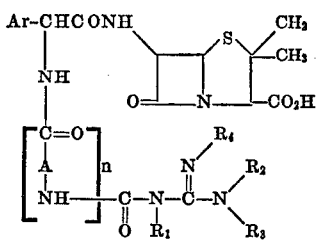

wherein Ar is phenyl, 4-hydroxyphenyl, 2-thienyl or 3-thienyl; A is alkylene of 1 to 4 carbon atoms or alkylidene of 2 to 4 carbon atoms; $n$ is an integer of 1 to 3; $R_1$, $R_2$, $R_3$ and $R_4$ considered separately are each hydrogen or alkyl of 1 to 4 carbon atoms, $R_1$ and $R_4$ considered together are alkylene of 2 to 4 carbon atoms; $R_2$ and $R_4$ considered together are alkylene of 2 to 4 carbon atoms; and $R_2$ and $R_3$ considered together are alkylene of 4 to 5 carbon atoms as broad spectrum antibiotics.

BACKGROUND OF THE INVENTION

This invention relates to a series of penicillins and in particular to 6-[2-aryl-2-(3-guanyl-1-ureidoalkanoylamino)acetamido]penicillanic acids and to the pharmaceutically acceptable basic salts thereof, possessing high antibacterial activity, especially against gram-negative micro-organisms.

The compounds in the group belonging to the family of penicillins differ from each other in the nature of the R variable and possess the general formula indicated below

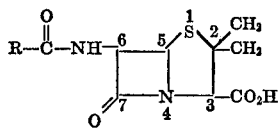

wherein the acyl moiety on the 6-aminopenicillanic acid is derived from a carboxylic acid or functional derivative thereof such as an acyl halide or anhydride.

The pharmacodynamic properties and antibiotic profile of a given penicillin are determined to a large extent by the nature of the R group. The most widely used penicillins are those wherein the R moiety is represented by benzyl-, phenoxymethyl- and α-phenoxyethyl-. While these well-known analogs are highly antagonistic toward gram-positive micro-organisms they have limited gram-negative activity. Consequently, drugs which will combat rise in gram-negative infections, e.g., *E. coli*, *Pseudomonas* or *Klebsiella*, are of value to the medical profession.

Recent efforts to improve the profile of activity within the family of penicillins has resulted in the synthesis of several new agents. α-Carboxybenzylpenicillins (U.S. Pat. 3,142,673), a broad spectrum antibiotic, is reported to have greater efficacy against gram-negative bacteria *via* the parenteral route of administration, but has limited utility *via* oral administration. α-Aminoarylmethylpenicillins and congeners thereof (U.S. Pats. 2,985,648, 3,140,-282, 3,373,156, 3,308,023 and 3,342,677) are known, but have a limited spectrum of activity against certain gram-negative micro-organisms. Both gram-negative and gram-positive activity are claimed for 6-ureidopenicillanic acid derivatives in U.S. Pats. 3,180,863, 3,120,512 and 3,118,-877 and for α-urediopenicillins in U.S. Pat. 3,352,851. Activity against gram-negative bacteria, especially those of the genus *Pseudomonas*, is claimed for α-carbamylureido-penicillins (U.S. Pat. 3,483,118) and α-alkoxycarbonyl-ureidopenicillins (U.S. Pat. 3,481,922). More recently, α-guanylureidopenicillins have been reported to be useful against infectious diseases, especially those caused by the *Pseudomonas* genus (U.S. Pat. 3,579,501 and Belgium Specification 742,423).

SUMMARY OF THE INVENTION

It has now been found that a family of penicillins represented by the formula

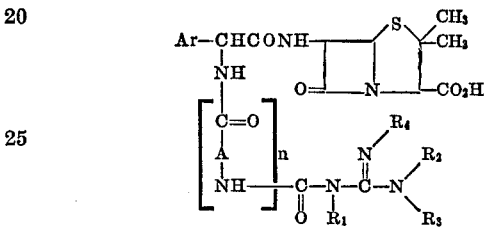

and the pharmaceutically acceptable basic salts thereof, wherein Ar is phenyl, 4-hydroxyphenyl, 2-thienyl or 3-thienyl; $n$ is an integer of 1 to 3; A is alkylene containing from 1 to 4 carbon atoms or alkylidene containing from 2 to 4 carbon atoms; $R_1$, $R_2$, $R_3$ and $R_4$ when considered separately are each hydrogen or alkyl containing from 1 to 4 carbon atoms; $R_1$ and $R_4$ when considered together are alkylene containing from 2 to 4 carbon atoms; $R_2$ and $R_4$ when considered together are alkylene containing from 2 to 4 carbon atoms; and $R_2$ and $R_3$ when considered together are alkylene containing from 4 to 5 carbon atoms, are potent antibacterial agents, especially against gram-negative micro-organisms.

A preferred group of congeners are those wherein $n$ is 1, A is alkylene or alkylidene of the above-mentioned carbon limitations, $R_1$, $R_2$, $R_3$ and $R_4$ are each hydrogen or alkyl and Ar is phenyl or 2-thienyl.

A second preferred class of compounds of the instant invention are those wherein Ar is phenyl, $n$ is 2 or 3 and A is alkylene of the aforesaid carbon limitation.

As one skilled in the art can readily appreciate, the α-carbon atom of the penicillin side chain to which the guanylureidoalkanoylamino moiety is attached is an asymmetric carbon atom allowing for the existence of two optically active isomers, the D- and L-diasteroisomers, as well as the racemate, DL form. In accord with previous finding concerning the activity of such penicillins possessing asymmetric α-carbon atoms, the compounds of the present invention possessing the D-configuration are more active than those of the L-configuration and are the preferred compounds, although the L and DL forms of the instant compounds are also considered within the purview of the present invention.

Compounds of the instant application wherein A is alkylidene, derived from an α-amino acid, have an asymmetric carbon atom allowing for D, L and DL forms. Although the natural form of the starting amino acid, the L form, is the preferred, the DL and D are considered within the scope of the present invention.

It is noteworthy to mention while considering asymmetric centers, that there are several in the 6-aminopenicillanic nucleus, the basic building block from which the compounds of the instant invention are derived. These potential additional isomers are not significant in this instance since the 6-aminopenicillanic acid employed as the starting material is that which is produced by fermentation and is consistently of one configuration.

Also considered within the purview of the present invention are 3-(1-alkanoyloxyalkyl) esters of the subject compounds as well as compounds of the aforementioned formula wherein, in addition to the mentioned variables, Ar is 1,4-cyclohexadien-1-yl or

can be cycloalkyl of 5–7 carbon atoms; A is cycloalkylene, cycloalkylidene, arylene, aralkylene, alkylenearalkylene, alkylene or alkylidene substituted by hydroxy, mercapto or methythio or alkylenearylene; A taken together with the nitrogen of the urea moiety forms a heterocyclic ring; and congeners wherein $R_1$, $R_2$, $R_3$ and $R_4$ are each phenyl or benzyl, or phenyl and benzyl substituted by one or more organic radicals.

DETAILED DESCRIPTION OF THE INVENTION

In accordance with the process employed for synthesizing the penicillins of the present invention two preparative routes are amenable. The first is illustrated as follows:

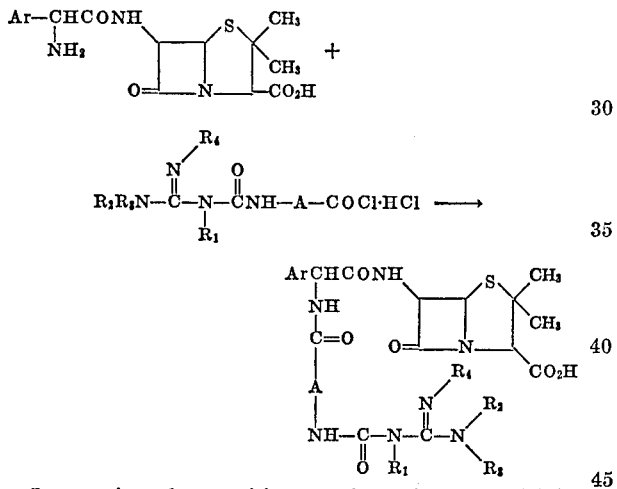

In practice, the requisite α-aminoarylmethylpenicillin and acid chloride, wherein Ar, A, $R_1$, $R_2$, $R_3$ and $R_4$ are previously indicated and n=1, are contacted in a reaction-inert, aprotic solvent in the presence of a hydrogen halide scavenger, such as a tertiary amine, at ice-bath temperatures. Equimolar amounts of the reactants are generally employed with as much as a 10–100% excess of the acid chloride. Generally, when one mole each of the reactants are employed, three moles of a tertiary amine, preferably triethylamine, are used. If additional acid chloride is added, a corresponding molar amount of amine is employed.

The reaction-inert solvent comprising the liquid phase of said reaction mixture should be one which does not react to any appreciable extent with either the reactants or product of said reaction. The preferred solvents should be anhydrous, aprotic, polar solvents such as dimethylformamide or hexamethylphosphoramide.

Although the initial contacting of the reactant is carried out at ice-bath temperature, in order to reduce the incidence of by-products, it is desirable after a few minutes of mixing to allow the reaction mixture to warm to room temperature until the reaction is complete or nearly complete. The reaction time, which will vary depending on temperature, concentration and inherent reactivity of the starting reagents, is usually from 0.5 to 4 hours.

On completion of the above-mentioned reaction, any insolubles are filtered and the product is precipitated by adding the filtrate to a large volume of diethyl ether. The crude product is isolated by suction filtration and drying. A suspension of the crude product in methylene chloride is rendered free of any trace amounts of starting α-aminoarylmethylpenicillin by the addition of a small amount of triethylamine, which converts the starting penicillin to the methylene chloride soluble triethylamine salt. The pure product is subsequently filtered and dried.

The starting reagents leading to the products of the present invention are easily prepared by methods familiar to those skilled in the art. The α-aminoarylmethylpenicillins are known and described in U.S. Pats. 2,985,-648 and 3,342,677 and by Long, et al., J. Chem. Soc., 1920 (1971), while the 3-guanyl-1-ureidoalkanoic acids are synthesized either by the procedure of Frankel, et al., J. Chem. Soc., 2698 (1967) or Shapiro, et al., J. Am. Chem. Soc., 81, 2220 (1959).

The alternate synthetic procedure employed in the preparation of the compounds of the present invention wherein Ar, A, n, $R_1$, $R_2$, $R_3$ and $R_4$ are as previously indicated, is illustrated as follows:

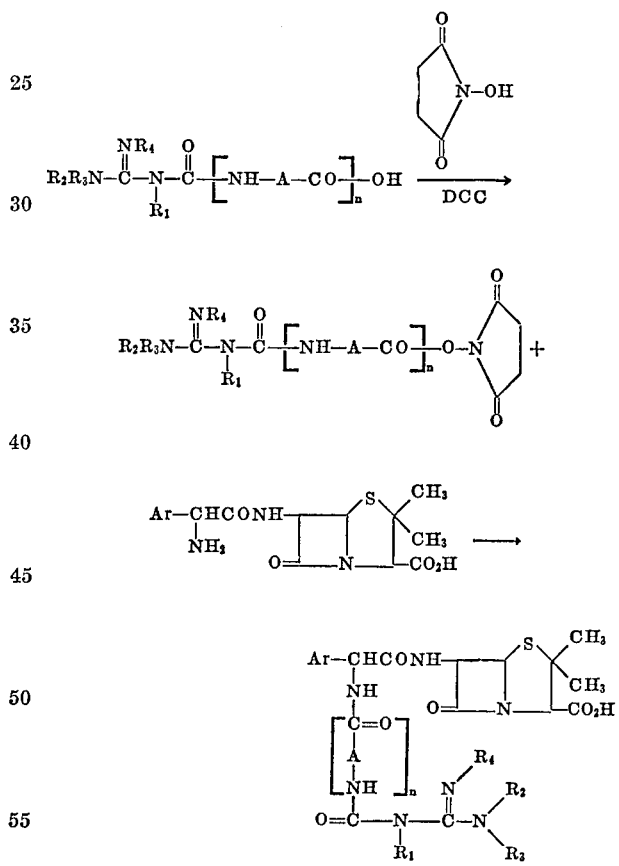

In accordance with the above outlined synthetic scheme, equimolar amounts of the requisite 3-guanyl-1-ureidoalkanoic acid, N-hydroxysuccinimide and dicyclohexylcarbodiimide (DCC), plus as much as a 50% excess of the two latter reagents, are contacted in a reaction-inert solvent, such as those indicated in the previously discussed preparative procedure, at ambient temperatures. After 1 to 3 hrs., the intermediate N-succinimido ester generated in situ, is treated with an equimolar amount, plus as much as a 50% excess, of the appropriate α-aminoarylmethylpenicillin, preferably as a basic salt. The reaction time can vary from 1 to 6 hrs. depending on the temperature, concentration and reactivity of the reagents employed.

The product is isolated, after filtration of the reaction mixture, by addition of the reaction filtrate to a large volume of diethyl ether. The product can be purified, when required, by employing triethylamine as mentioned in the previously discussed preparative method.

The starting materials employed in this second synthetic procedure leading to the compounds of the present invention are either commercial reagents or are prepared by methods familiar to those skilled in the art.

As one skilled in the art can recognize, the guanidine moiety of the instantly claimed compounds can exist in several different tautomeric forms, all of which are considered within the purview of the present invention.

As has been previously noted, a characteristic feature of the acidic compounds of the instant invention is their ability to form basic salts. Acid congeners of the present invention are converted to basic salts by the interaction of said acid with an appropriate base in an aqueous or nonaqueous medium. Such basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, secondary amines such as dicyclohexylamine and tertiary amines such as diethylaniline, N-methylpyrrolidine, N-methylmorpholine and 1,5-diazabicyclo-[4,3,0]-5-nonene; sodium hydroxide, potassium hydroxide, ammonium hydroxide, sodium ethoxide, potassium methoxide, magnesium hydroxide, calcium hydride and barium hydroxide.

As one skilled in the art can readily appreciate, the compounds of the instant invention are sufficiently basic, by virtue of the guanyl moiety, to form acid addition salts; said salts are also considered within the scope of this invention.

In the utilization of the chemotherapeutic activity of those compounds of the present invention which form basic salts, it is preferred, of course, to use pharmaceutically acceptable salts. Although water insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The said pharmaceutically acceptable salts preferred include the sodium, aluminum, potassium, calcium, magnesium, ammonium and substituted ammonium salts, e.g., procaine, dibenzylamine, N,N-bis(dehydroabietyl)ethylenediamine, 1 - ephenamine, N-ethylpiperidine, N-benzyl-$\beta$-phenethylamine, N,N'-dibenzylethylenediamine, triethylamine, as well as salts with other amines which have been used to form salts with benzylpenicillin.

The novel penicillins described herein exhibit in vitro activity against a wide variety of microorganisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like, or for sterilization purposes, e.g., sick-room utensils.

These novel penicillins are also effective antibacterial agents in vivo in animals, including man, not only via the parenteral route of administration but also by the oral route of administration.

Obviously, the physician will ultimately determine the dosage which will be most suitable for a particular individual person, and it will vary with the age, weight and response of the particular patient as well as with the nature and extent of the symptoms and the pharmacodynamic characteristics of the particular agent to be administered. It will often be found that when the composition is administered orally, larger quantities of the active ingredient will be required to produce the same level as produced by a small quantity administered parenterally.

Having full regard for the foregoing factors it is considered that an effective daily oral dose of the compounds of the present invention in humans of approximately 10–100 mg./kg. per day, with a preferred range of about 50–75 mg./kg. per day in single or divided doses, and a parenteral dose of 25–100 mg./kg. per day, with a preferred range of about 20–75 mg./kg. per day will effectively alleviate the symptoms of the infection. These values are illustrative, and there may, of course, be individual cases where higher or lower dose ranges are merited.

As has been previously mentioned, the penicillins of the present invention are broad spectrum antibiotics which are, unlike many penicillin analogs, highly antagonistic toward gram-negative microorganisms, in particular E. coli, Pseudomonas and Klebsiella. Further, they appear to be more resistant than most penicillins to destruction by penicillinase, an enzyme produced by certain bacteria which degrades penicillin to an inactive penicillanic acid.

The preferred compounds of the present invention are 6-[2-phenyl-2-(3-guanyl - 1 - ureidoacetamido)acetamido] penicillanic acid, 6-[2-phenyl-2-($\beta$-3-guanyl-1-ureidopropionamido)acetamido]penicillanic acid, 6-[2-(2-thienyl)-2-(3-guanyl - 1 - ureidoacetamido)acetamido]penicillanic acid, 6-[2-phenyl-2-(3-guanyl-1-ureidoacetylglycinamido)-acetamido]penicillanic acid, 6 - [2 - phenyl - 2 - (3-guanyl-1 - ureidoacetylglycylglycinamido)acetamido]penicillanic acid and 6-[2-phenyl-2-(3-{N-methylguanyl}-1-ureidoacetamido)acetamido]penicillanic acid. Further preferred within this group of outstanding compounds are those diasterioisomers of the D-configuration.

The antimicrobial spectra of a number of compounds of the instant invention are provided in the following tables. Table I compares the in vitro profile of 6-[D-2-phenyl - 2 - (3-guanyl-1-uredioacetamido)acetamido]penicillanic acid (PGU) with ampicillin (AMP) and carbenicillin (CAR). The tests were run under standardized conditions in which nutrient broth containing various concentrations of the test material was seeded with the particular organism specified, and the minimum concentration (MIC) at which growth of each organism failed to occur was observed and recorded.

TABLE I

In vitro Comparison Data for PGU, AMP, and CAR (MIC; mcg./ml.)

| Organism | MIC | | |
|---|---|---|---|
| | PGU | AMP | CAR |
| E. coli 51A266 | 0.39 | 3.12 | 3.12 |
| E. coli 51A002 | 200 | 200 | 200 |
| Ps. aeruginosa 52A490 | 0.39 | 0.78 | 0.6 |
| Ps. aeruginosa 52A104 | 3.12 | 200 | 50 |
| Ps. aeruginosa 52A173 | 3.12 | 38 | 75 |
| Kleb. pneumoniae 53A009 | 25 | 100 | 200 |
| Kleb. pneumoniae 53A015 | 25 | 250 | >200 |
| A. aerogenes 55A002 | 0.78 | 100 | 25 |
| A. aerogenes 55A004 | 0.78 | 5 | 50 |
| Ser. marcescens 63A001 | 1.56 | 200 | 25 |
| P. mirabilis 57C015 | 0.78 | 1.56 | 1.25 |
| P. vulgaris 57A059 | 0.78 | 6 | 12.5 |
| S. aureus 01A005 | 0.19 | 0.09 | 1.56 |

Table II presents the in vivo comparison data for the three compounds contained in Table I against several experimental infections in mice.

The values (percent of survivors) are obtained under standard conditions known to those skilled in the art. For the E. coli organism, the test compounds is administered to the infected mice by a multiple dosing regimen in which the first dose is given 0.5 hour after inoculation and is repeated four and twenty-four hours later. Against Ps. aeruginosa, the test compound is administered at 1, 3, 5, 7 and 24 hrs. after inoculation.

TABLE II

| Organism | Route[1] | Dose (mg./kg.) | Percent protection[2] | | |
|---|---|---|---|---|---|
| | | | PGU | AMP | CAR |
| E. coli 51A266 | PO | 200 | 50 | 90 | 70 |
| | | 50 | 30 | 80 | 10 |
| | | 25 | 10 | | |
| E. coli 51A266 | SC | 200 | 90 | 90 | 90 |
| | | 50 | 70 | 80 | 90 |
| | | 25 | 80 | | |
| Ps. aeruginosa 52A104 | SC | 400 | 90 | | 80 |

[1] PO=oral; SC=subcutaneous route of administration.
[2] Percent of survivors.

Table III presents additional *in vitro* data for related compounds of the instant invention.

TABLE III

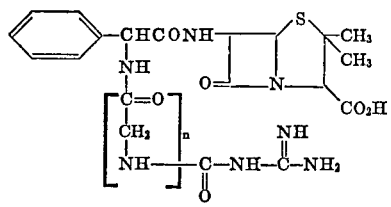

| Organism | MIC (mcg./ml.) | | |
|---|---|---|---|
| | $n=1$ | $n=2$ | $n=3$ |
| S. aureus 01A005 | 0.19 | 0.73 | 3.12 |
| S. aureus 01A006 | 0.78 | 0.78 | 1.56 |
| S. aureus 01A212 | 25 | 50 | 50 |
| Strep. pyogenes 020203 | <0.01 | 0.098 | 0.012 |
| Ps. aeruginosa 52A104 | 3.12 | 6.25 | 25 |
| Ps. aeruginosa 52A490 | 0.39 | 0.78 | 3.12 |
| Kleb. pneumoniae 53A009 | 25 | 100 | >200 |
| H. influenzae 54A001 | 0.09 | 0.39 | 0.39 |
| A. aerogenes 55A002 | 0.78 | 35 | 50 |
| P. mirabilis 57C015 | 0.78 | 12.5 | 50 |
| Sal. cholerae-suis 58B242 | 1.5 | 12.5 | 25 |
| Ser. marcescens 63A001 | 1.56 | 50 | 200 |

Table IV presents *in vivo* comparison data for the three compounds in Table III against *E. coli* infections in mice.

The values, reported as percent survivors, are obtained under standard conditions familiar to those skilled in the art. The test compound is administered to the infected mice by a multiple dosing regimen in which the first dose is given 0.5 hour after inoculation and is repeated four and twenty-four hours later.

TABLE IV

| Organism | Route | Dose (mg./kg.) | Percent protection | | |
|---|---|---|---|---|---|
| | | | $n=1$ | $n=2$ | $n=3$ |
| E. coli 51A266 | PO | 200 | 50 | 70 | 50 |
| | | 50 | 10 | 20 | 20 |
| | | 25 | 30 | 10 | 10 |
| E. coli 51A266 | SC | 200 | 90 | 100 | 60 |
| | | 50 | 70 | 50 | 40 |
| | | 25 | 80 | 40 | 30 |

The novel products of this invention are of value as antibacterial agents and are remarkably effective in treating a number of infections caused by susceptible gram-negative and gram-positive bacteria in poultry and animals including man. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk, sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the form of a sterile aqueous solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are nontoxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The following examples are provided solely for the purpose of illustration and are not to be construed as limitations of this invention, many variations of which are possible without departing from the spirit or scope thereof.

EXAMPLE 1

6-[D-2-Phenyl-2-(3-guanyl-1-ureidoacetamido)acetamido]penicillanic Acid (Ar=φ; A=CH$_2$; $n=1$; R$_1$, R$_2$, R$_3$ and R$_4$=H)

A. To a suspension of 12.7 g. (0.0325 mole) of D-α-aminobenzylpenicillin trihydrate suspended in 200 ml. of dimethylformamide at room temperature and under a nitrogen atmosphere is added 9.15 ml. of triethylamine, and the resulting solution cooled to 0° C. in an ice bath. Over a period of 2 min. two 3.5 g. portions (0.0325 mole) of guanylureidoacetyl chloride hydrochloride are added to the reaction mixture with vigorous stirring and the mixture stirred at 0° C. for 5 min. and at room temperature for 50 min. The mixture is cooled again in an ice bath and 4.55 ml. of triethylamine and an additional two 3.5 g. portions of the acid chloride added over a 2 min. period. After stirring at 0° C. for 10 min. and at room temperature for 1 hr., the mixture is filtered and the filtrate added to 3 l. of diethyl ether. The crude product, 19.5 g., is suspended in 200 ml. of methylene chloride containing 5 ml. of triethylamine and allowed to stir for 2 hrs. The product, a white powder, is filtered and dried, 14.0 g. (88% yield).

Infrared spectrum peaks (microns; KBr): 3.0, 3.5, 5.6, 5.75–6.3 (b), 6.3–6.75 (b), 7.2, 7.6, and 8.1.

Nuclear magnetic resonance spectrum peaks (PPM; DMSO-D$_6$): 1.5 (d), 6H; 3.9 (c), 2H; 4.0 (s), 1H; 5.4 (c), 2H; 5.8 (c), 1H; 7.4 (c), 7H; and 8.4–9.2 (c), 5H.

B. To a solution of 345 mg. (3 mmoles) of N-hydroxysuccinimide and 620 mg. (3 mmoles) of dicyclohexylcarbodiimide in 15 ml. of dry dimethylformamide is added 587 mg. (3 mmoles) of 3-guanyl-1-ureidoacetic acid hydrochloride, and the mixture allowed to stir at room temperature for 2 hrs. D-α-Aminobenzylpenicillin triethylamine salt (1.35 mg., 3 mmoles) is added and stirring is continued for an additional 3 hrs. Dimethylformamide (20 ml.) is added to the reaction mixture followed by filtration and addition of the clear filtrate to 1.2 l. of diethyl ether. The dried white precipitate, 947 mg., isolated by suction filtration, is suspended in 50 ml. of methylene chloride and treated with one ml. of triethylamine. After one hr. of stirring, the purified product is collected and dried *in vacuo*, 537 mg. (36.5% yield).

The product is identical in every respect with that isolated *via* the acid chloride preparation procedure of Example 1–A.

EXAMPLE 2

6-[D-2-Phenyl-2-(β-3-guanyl-1-ureidopropionamido)acetamido]penicillanic Acid (Rr=φ; A=—(CH$_2$)$_2$—; $n=1$; R$_1$, R$_2$ R$_3$ and R$_4$=H)

β-(3-Guanyl-1-ureido)propionic acid hydrochloride (840 mg.; 4 mmoles) is added to a solution of 785 mg. (3.8 mmoles) of dicyclohexylcarbodiimide and 440 mg. (3.8 mmoles) of N-hydroxysuccinimide in 15 ml. of dry dimethylformamide at room temperature and under a nitrogen atmosphere, and the mixture allowed to stir for 2 hrs. D-α-Aminobenzylpenicillin triethylamine salt (1.71 g., 3.8 mmoles) is added, and the reaction mixture allowed to stir for 1.5 hrs. The mixture is filtered, and the filtrate added to 400 ml. of diethyl ether. The desired product, a white powder, after purification employing the technique of Example 1, is filtered and dried, 1.4 g. (73% yield).

Infrared spectrum peaks (microns; KBr): 3.0, 3.35, 5.6, 5.75–6.3 (b), 6.3–6.8 (b), 7.15, 7.85 and 8.0.

Nuclear magnetic resonance spectrum peaks: (PPM, DMSO-$D_6$): 1.5 (d), 6H; 2.5 (c), 2H; 3.3 (c), 2H; 4.0 (s), 1H; 5.4 (c), 2H; 5.75 (c), 1H; 7.1–7.8 (c), 7H; and 8.3–9.3 (c), 5H.

EXAMPLE 3

6 - [D - 2 - (2 - Thienyl) - 2 - (guanylureidoacetamido) acetamido]penicillanic acid (Ar=2 - thienyl; A=$CH_2$; $n$=1; $R_1$, $R_2$, $R_3$ and $R_4$=H)

A 150 ml. flask fitted with a nitrogen bleed is charged with 3.55 g. (0.01 mole) of D-α-amino-2-thienylmethylpenicillin suspended in 70 ml. of dry dimethylformamide, and the resulting suspension treated with 3.06 ml. (0.022 mole) of triethylamine. The reaction mixture is cooled to 0° C. and treated with 2.35 g. (0.011 mole) of guanylureidoacetyl chloride hydrochloride added portionwise over a period of 2 min. The suspension is allowed to warm to room temperature and remain at this temperature for 30 min., after which the mixture is treated with an additional 1.5 ml. (0.011 mole) of triethylamine, cooled to 0° C. and treated with 2.35 g. (0.011 mole) of the acid chloride portionwise. After stirring at 0° C. for 10 min., the mixture is allowed to warm to room temperature and remain at this temperature for 1–2 hrs. The small amount of insolubles are filtered, and the filtrate poured into 1 l. of diethyl ether. The precipitated product, after stirring for 30 min., is filtered and dried. It is further purified using methylene chloride and triethylamine as in Example 1.

EXAMPLE 4

Starting with the appropriate α-aminoarylmethylpenicillin and guanylureidoalkanoyl chloride hydrochloride, and employing the general procedure of Example 1, the following penicillins of the configuration shown are synthesized:

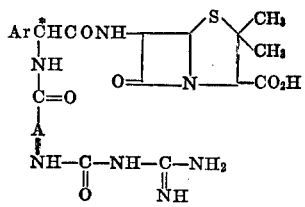

| Ar | * | $A^1$ | Ar | * | $A^1$ |
|---|---|---|---|---|---|
| $C_6H_5$— | D | —$(CH_2)_3$— | 2-$C_4H_3S$— | D | —$(CH_2)_2$— |
| $C_6H_5$— | D | —$(CH_2)_4$— | 2-$C_4H_3S$— | DL | —$(CH_2)_3$— |
| $C_6H_5$— | L | —$CH(CH_3)CH_2$— | 2-$C_4H_3S$— | DL | —$CH(CH_3)CH_2$— |
| $C_6H_5$— | D | —$CH(CH_3)CH(CH_3)$— | 2-$C_4H_3S$— | L | —$CH_2CH(CH_3)$— |
| $C_6H_5$— | DL | —$CH_2CH(CH_3)CH_2$— | 2-$C_4H_3S$— | D | —$CH(CH_3)CH(CH_3)$— |
| $C_6H_5$— | L | —$C(CH_3)_2CH_2$— | 2-$C_4H_3S$— | D | —$CH_2CH(CH_3)CH_2$— |
| 4-HO$C_6H_4$— | D | —$CH_2$— | 2-$C_4H_3S$— | D | $CH_3CH$— |
| 4-HO$C_6H_4$— | L | —$(CH_2)$— | 2-$C_4H_3S$— | D | $(CH_3)_2CHCH$— |
| 4-HO$C_6H_4$— | L | —$CH(CH_3)CH_2$— | 2-$C_4H_3S$— | D | $CH_3(CH_2)_2CH$— |
| 4-HO$C_6H_4$— | D | —$(CH_2)_4$— | 3-$C_4H_3S$— | D | —$CH_2$— |
| 4-HO$C_6H_4$— | DL | —$CH_2CH(CH_3)CH_2$— | 3-$C_4H_3S$— | DL | —$(CH_2)_2$— |
| 4-HO$C_6H_4$— | DL | —$CH_2CH(CH_3)$— | 3-$C_4H_3S$— | L | —$(CH_2)_4$— |
| $C_6H_4$— | L | $CH_3CH$— | 3-$C_4H_3S$— | L | —$CH(CH_3)CH_2$— |
| $C_6H_4$— | D | $(CH_3)_2CHCH$— | 3-$C_4H_3S$— | DL | —$CH_2CH(CH_3)$— |
| 4-HO$C_6H_4$— | L | $(CH_3)_2CHCH$— | 3-$C_4H_3S$— | D | —$CH_2CH(CH_3)CH_2$— |
| 4-HO$C_6H_4$— | L | $CH_3(CH_2)_2CH$— | 3-$C_4H_3S$— | L | $CH_3CH$— |
| 4-HO$C_6H_4$— | D | $CH_3CH$— | 3-$C_4H_3S$— | L | $(CH_3)_2CHCH$— |

[1] In this and subsequent tables, the A group representing alkylene is written in such a manner that the left bond of the group is attached to the —$\overset{O}{\underset{\|}{C}}$— group and the right bond of the group to the NH atom.

EXAMPLE 5

6-[D-2-Phenyl-2-(3-{N-methylguanyl}1-ureidoacetamido) acetamido]penicillanic Acid (Ar=φ; A=$CH_2$; $n$=1; $R_1$, $R_2$, and $R_4$=H; $R_3$=$CH_3$)

A suspension of 2.25 g. (5 mmoles) of D-α-aminobenzylpenicillin triethylamine salt in 25 ml. of dry dimethylformamide, maintained under a nitrogen atmosphere, is treated with 0.7 ml. (5 mmoles) of triethylamine, and the reaction mixture cooled to —30° C. 3-(N-methylguanyl)-1-ureidoacetyl chloride hydrochloride (2.28 g., 0.01 mole) is added in divided portions over a period of 3 min. to the vigorously stirred reaction mixture at ice bath temperature. After stirring for 2 hrs. at ice bath temperatures, the mixture is suction filtered, and the filtrate poured into a mixture of chloroform (500 ml.) and acetone (500 ml.). The resulting precipitate, after stirring overnight at room temperature, is collected and dried in vacuo, 1.5 g., m.p. 195° C., dec.

EXAMPLE 6

The general procedure of Example 5 is repeated, starting with the α-aminoarylmethylpenicillins and the requisite guanylureidoacetyl chlorides, to provide the following congeners:

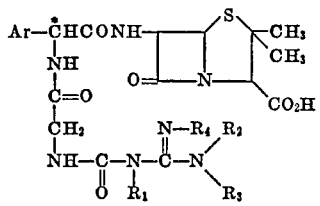

| Ar | * | $R_1$ | $R_4$ | $R_2$ | $R_3$ |
|---|---|---|---|---|---|
| $C_6H_5-$ | D | $CH_3-$ | H— | H— | $CH_3-$ |
| $C_6H_5-$ | D | H— | H— | $CH_3-$ | $CH_3-$ |
| $C_6H_5-$ | D | H— | $CH_3-$ | $CH_3-$ | $CH_3-$ |
| $C_6H_5-$ | D | H— | H— | H— | $C_2H_5-$ |
| $C_6H_5-$ | D | H— | H— | $C_2H_5-$ | $C_2H_5-$ |
| $C_6H_5-$ | D | H— | $C_2H_5-$ | H— | $C_2H_5-$ |
| $C_6H_5-$ | D | $CH_3-$ | H— | H— | $CH_3-$ |
| $C_6H_5-$ | D | H— | H— | H— | $i$-$C_3H_7-$ |
| $C_6H_5-$ | D | H— | H— | H— | $s$-$C_4H_9-$ |
| $C_6H_5-$ | DL | H— | H— | H— | $C_6H_5CH_2-$ |
| $C_6H_5-$ | DL | H— | H— | H— | $C_6H_5-$ |
| 4-HO$C_6H_4-$ | D | H— | H— | H— | $CH_3-$ |
| $C_6H_5-$ | D | —$(CH_2)_3-$ | | H— | |

TABLE—Continued

| Ar | * | $R_1$ | $R_4$ | $R_2$ | $R_3$ |
|---|---|---|---|---|---|
| 4-HO$C_6H_4-$ | D | H— | $CH_3-$ | H— | $CH_3-$ |
| 4-HO$C_6H_4-$ | D | H— | H— | $C_6H_5-$ | $C_6H_5-$ |
| 4-HO$C_6H_4-$ | D | H— | H— | $n$-$C_3H_7-$ | $n$-$C_3H_7-$ |
| 4-HO$C_6H_4-$ | D | H— | H— | $C_2H_5-$ | $i$-$C_3H_7$ |
| 4-HO$C_6H_4-$ | DL | H— | H— | $C_2H_5-$ | $CH_3-$ |
| 4-HO$C_6H_4-$ | L | H— | H— | $C_2H_5-$ | $C_6H_5-$ |
| 4-HO$C_6H_4-$ | L | $C_2H_5-$ | H— | H— | $CH_3-$ |
| 2-$C_4H_3S-$ | DL | H— | H— | $CH_3-$ | $CH_3-$ |
| 2-$C_4H_3S-$ | L | —$(CH_2)_3-$ | | H— | H— |
| 2-$C_4H_3S-$ | D | H— | H— | H— | $t$-$C_4H_9-$ |
| 2-$C_4H_3S-$ | D | H— | H— | $C_6H_5CH_2-$ | $CH_3-$ |
| 2-$C_4H_3S-$ | D | H— | H— | $C_6H_5CH_2-$ | $C_6H_5CH_2-$ |
| 2-$C_4H_3S-$ | D | H— | H— | | —$(CH_2)_5-$ |
| 2-$C_4H_3S-$ | DL | H— | —$(CH_2)_3-$ | | H— |
| 2-$C_4H_3S-$ | DL | H— | H— | H— | $C_6H_5-$ |
| 2-$C_4H_3S-$ | DL | H— | H— | $C_6H_5-$ | $C_6H_5-$ |
| 3-$C_4H_3S-$ | D | H— | $CH_3-$ | $CH_3-$ | $CH_3-$ |
| 3-$C_4H_3S-$ | L | $n$-$C_3H_7-$ | H— | H— | $CH_3-$ |
| 3-$C_4H_3S-$ | L | $CH_3-$ | H— | $CH_3-$ | $CH_3-$ |
| 3-$C_4H_3S-$ | L | $n$-$C_3H_7-$ | H— | H— | $i$-$C_3H_7-$ |
| 3-$C_4H_3S-$ | D | H— | $i$-$C_3H_7-$ | H— | $i$-$C_3H_7-$ |
| 3-$C_4H_3S-$ | DL | H— | H— | $C_6H_5-$ | $C_6H_5-$ |
| 3-$C_4H_3S-$ | D | H— | $t$-$C_4H_9-$ | H— | $CH_3-$ |
| 3-$C_4H_3S-$ | D | H— | H— | $C_6H_5CH_2-$ | $CH_3-$ |
| 3-$C_4H_3S-$ | D | —$(CH_2)_3-$ | | H— | H— |
| 3-$C_4H_3S-$ | D | | —$(CH_2)_2-$ | | H— |
| 3-$C_4H_3S-$ | D | H— | | —$(CH_2)_3-$ | H— |
| 3-$C_4H_3S-$ | D | H— | H— | | —$(CH_2)_4-$ |

EXAMPLE 7

The procedure of Example 5 is again repeated, starting with the appropriate DL-α-aminoarylmethylpenicillins and guanylureidoalkanoyl chloride, to provide the following products:

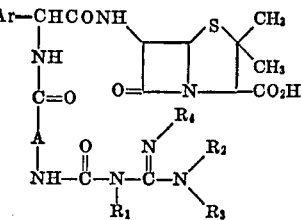

| Ar | A | $R_1$ | $R_4$ | $R_2$ | $R_3$ |
|---|---|---|---|---|---|
| $C_6H_5-$ | —$(CH_2)_2-$ | H— | H— | H— | $CH_3-$ |
| $C_6H_5-$ | $CH_3CH-$ | H— | H— | $n$-$C_3H_7-$ | $n$-$C_3H_7-$ |
| $C_6H_5-$ | —$CH(CH_3)CH_2-$ | H— | $CH_3-$ | $CH_3-$ | $CH_3-$ |
| $C_6H_5-$ | —$(CH_2)_3-$ | H— | H— | H— | $t$-$C_4H_9-$ |
| $C_6H_5-$ | $(CH_3)_2CHCH-$ | H— | H— | $C_6H_5CH_2-$ | $CH_3-$ |
| $C_6H_5-$ | —$C(CH_3)_2CH_2-$ | H— | H— | | —$(CH_2)_5-$ |
| $C_6H_5-$ | —$CH_2CH(CH_3)CH_2-$ | H— | —$(CH_2)_3-$ | | H— |
| 4-HO$C_6H_4-$ | —$(CH_2)_2-$ | H— | H— | H— | $C_6H_5-$ |
| 4-HO$C_6H_4-$ | —$CH_2CH(CH_3)CH_2-$ | H— | $C_6H_5-$ | H— | $C_6H_5-$ |
| 4-HO$C_6H_4-$ | —$CH(CH_3)CH_2-$ | H— | $C_6H_5CH_2-$ | H— | $C_6H_5-$ |
| 4-HO$C_6H_4-$ | —$CH_2-$ | H— | H— | $C_2H_5-$ | $C_2H_5-$ |
| 4-HO$C_6H_4-$ | $CH_3CH-$ | H— | $i$-$C_3H_7-$ | H— | $i$-$C_3H_7-$ |
| 4-HO$C_6H_4-$ | $CH_3(CH_2)_2CH-$ | H— | H— | H— | $i$-$C_4H_9-$ |
| 4-HO$C_6H_4-$ | —$CH_2-$ | $CH_3-$ | H— | H— | $CH_3-$ |
| 4-HO$C_6H_4-$ | —$CH_2CH(CH_3)-$ | H— | $CH_3-$ | H— | $t$-$C_4H_9-$ |
| 4-HO$C_6H_4-$ | —$(CH_2)_4-$ | $n$-$C_3H_7-$ | H— | H— | $i$-$C_3H_7-$ |
| 4-HO$C_6H_4-$ | —$CH(CH_3)CH(CH_3)-$ | | —$(CH_2)_2-$ | | —$(CH_2)_5-$ |
| 4-HO$C_6H_4-$ | —$(CH_2)_2-$ | H— | H— | | —$(CH_2)_4-$ |
| 4-HO$C_6H_4-$ | —$CH_2-$ | $CH_3-$ | $CH_3-$ | $CH_3-$ | $CH_3-$ |
| 2-$C_4H_3S-$ | —$CH_2-$ | H— | $C_2H_5-$ | H— | $i$-$C_3H_7-$ |
| 2-$C_4H_3S-$ | —$(CH_2)_2-$ | H— | H— | $CH_3-$ | $CH_3-$ |
| 2-$C_4H_3S-$ | $CH_3CH-$ | H— | H— | H— | $C_6H_5-$ |
| 2-$C_4H_3S-$ | —$CH(CH_3)CH_2-$ | H— | H— | H— | $C_6H_5CH_2-$ |
| 2-$C_4H_3S-$ | —$CH(CH_3)CH_2-$ | H— | H— | $C_6H_5-$ | $C_6H_5-$ |
| 2-$C_4H_3S-$ | —$CH(CH_3)CH(CH_3)-$ | H— | H— | $C_6H_5-$ | $C_2H_5-$ |
| 2-$C_4H_3S-$ | $(CH_3)CHCH-$ | H— | $C_6H_5-$ | H— | $C_6H_5-$ |
| 2-$C_4H_3S-$ | $CH_3(CH_2)_2CH-$ | $CH_3-$ | H | | —$(CH_2)_4-$ |
| 2-$C_4H_3S-$ | —$CH_2-$ | | —$(CH_2)_3-$ | H | $CH_3-$ |
| 3-$C_4H_3S-$ | —$CH_2-$ | H— | —$(CH_2)_3-$ | | H— |
| 3-$C_4H_3S-$ | $CH_3CH-$ | H | H— | $C_2H_5-$ | $C_2H_5-$ |
| 3-$C_4H_3S-$ | $CH_3CH-$ | H— | $C_2H_5-$ | H— | $C_2H_5-$ |

TABLE—Continued

| Ar | A | R₁ | R₄ | R₂ | R₃ |
|---|---|---|---|---|---|
| $3\text{-}C_4H_3S-$ | $-CH_2-$ | $C_6H_5CH_2-$ | H— | H— | H— |
| $3\text{-}C_4H_3S-$ | $CH_3CH-$ | H— | H— | H— | $t\text{-}C_4H_9-$ |
| $3\text{-}C_4H_3S-$ | $-(CH_2)_4-$ | H— | $CH_3-$ | $CH_3-$ | $CH_3-$ |
| $3\text{-}C_4H_3S-$ | $CH_3(CH_2)_2CH-$ | H— | H— |  | $-(CH_2)_5-$ |
| $3\text{-}C_4H_3S-$ | $-CH_2-$ | H— | H— | H— | $t\text{-}C_4H_9-$ |
| $3\text{-}C_4H_3S-$ | $-CH(CH_3)CH_2-$ | $n\text{-}C_4H_9-$ | H— | H— | $CH_3-$ |
| $3\text{-}C_4H_3S-$ | $-CH_2-$ |  | $-(CH_2)_3-$ | H— | $CH_3-$ |
| $3\text{-}C_4H_3S-$ | $-CH_2CH(CH_3)CH_2-$ | H— | H— | $-(CH_2)_2-$ | $C_2H_5-$ |
| $3\text{-}C_4H_3S-$ | $-(CH_2)_2-$ | H— | $t\text{-}C_3H_7-$ | H— | $i\text{-}C_3H_7-$ |

EXAMPLE 8

6 - [D - 2-Phenyl-2-(3-guanyl-1-ureidoacetylglycinamido)-acetamido[penicillanic acid (Ar=φ; A=$CH_2$; n=2; $R_1$, $R_2$, $R_3$ and $R_4$=H)

To 175 ml. of dimethylformamide, maintained under a nitrogen atmosphere, is added 4.3 g. (17 mmoles) of 3-guanyl-1-ureidoacetylglycine hydrochloride followed by the addition of 2.42 g. (21 mmoles) of N-hydroxysuccinimide and 4.35 g. (21 mmoles) of N,N'-dicyclohexylcarbodiimide. The resulting suspension is allowed to stir for 2.5 hrs. and is then filtered. D-α-Aminobenzylpenicillin triethylamine salt (9.45 g., 21 mmoles) is added to the filtrate and the mixture allowed to stir at room temperature for 2 hrs. The mixture is filtered and the filtrate added dropwise over a 20 min. period to 2.5 l. of diethyl ether. The resulting precipitate is stirred for 20 min., filtered and slurried in methylene chloride to which is added 4.5 ml. of triethylamine. After 25 min. the product, as a tan solid, is filtered and vacuum dried, 8.9 g.

Infrared spectrum peaks (microns; KBr): 3.05, 5.65, 6.04, 6.58, 7.20, 7.60 and 8.10.

Nuclear magnetic resonance spectrum peaks (PPM: $D_2O$): 1.32, 6H; 3.85; 6.35, (2H); and 7.32, (5H).

EXAMPLE 9

6 - [D - 2-Phenyl-2-(3-guanyl-1-ureidoacetylglycylglycinamido)-acetamido]penicillanic acid (Ar=φ; A=$CH_2$; n=3; $R_1$, $R_2$, $R_3$ and $R_4$=H)

To a solution of 310 mg. (1 mmole) of 3-guanylureidoacetylglycylglycine hydrochloride in 8 ml. of dry dimethylformamide under a nitrogen atmosphere is added successively 115 mg (1 mmole) of N-hydroxysuccinimide and 206 mg. (1 mmole) of N,N'-dicyclohexylcarbodiimide, and the resulting solution allowed to stir at room temperature for 2 hrs. D-α-Aminobenzylpenicillin triethylamine salt (450 mg., 1 mmole) is added all at once and the mixture stirred an additional 3 hrs. The solids are filtered, washed with a small amount of dimethylformamide, and the filtrate and washings combined and added dropwise to 400 ml. of diethyl ether. The precipitate is filtered and slurred in methylene chloride to which is added six drops of triethylamine. After stirring for 30 min. the product is filtered and dried in vacuo, 310 mg.

Infrared spectrum peaks (microns; KBr): 3.05, 5.65, 6.05, 6.55, 7.20 and 8.10.

Nuclear magnetic spectrum peaks (PPM; DMSO-$D_2O$): 1.40, (6H); 3.20–4.1 (b); 3.38, (1H); 5.7, (1H); and 7.34, (5H).

EXAMPLE 10

Starting with the requisite guanylureidoalkanoylaminoacid or guanylureidoalkanoyldipeptide and DL-α-aminoarylmethylpenicillin triethylamine salt and following the general procedure of Example 8 or 9, the following compounds are prepared:

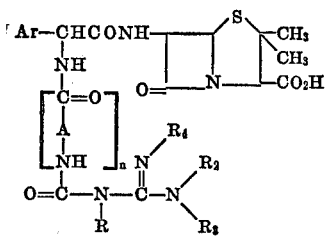

| Ar | A | n | R₁ | R₄ | R₂ | R₃ |
|---|---|---|---|---|---|---|
| $C_6H_5-$ | $-(CH_2)_2-$ | 2 | H— | H— | H— | H— |
| $C_6H_5-$ | $-(CH_2)_2-$ | 3 | H— | H— | H— | H— |
| $C_6H_5-$ | $-CH(CH_3)CH_2-$ | 2 | H— | H— | H— | $CH_3-$ |
| $C_6H_5-$ | $CH_3CH-$ | 2 | H— | H— | $n\text{-}C_3H_7-$ | $n\text{-}C_3H_7-$ |
| $C_6H_5-$ | $CH_3CH-$ | 3 | H— | $C_2H_5-$ | H— | $C_2H_5-$ |
| $C_6H_5-$ | $-CH(CH_3)CH(CH_3)-$ | 2 | H— | $CH_3-$ | $CH_3-$ | $CH_3-$ |
| $C_6H_5-$ | $-(CH_2)_2-$ | 2 | $C_2H_5-$ | H— | H— | $CH_3-$ |
| $C_6H_5-$ | $-(CH_2)_4-$ | 2 | H— | H— | $C_6H_5CH_2-$ | $CH_3-$ |
| $C_6H_5-$ | $-(CH_2)_2-$ | 3 | $-(CH_2)_2-$ |  |  | $-(CH_2)_5-$ |
| $4\text{-}HOC_6H_4-$ | $-(CH_2)_2-$ | 2 | H— | $-(CH_2)_3-$ |  | H— |
| $4\text{-}HOC_6H_4-$ | $CH_3CH_2CH-$ | 2 | H— | $t\text{-}C_4H_9-$ | H— | $CH_3-$ |
| $4\text{-}HOC_6H_4-$ | $CH_3CH_2CH-$ | 2 | H— | H— | $C_6H_5CH_2-$ | $C_6H_5CH_2-$ |
| $4\text{-}HOC_6H_4-$ | $-CH_2CH(CH_3)-$ | 3 | H— | $i\text{-}C_3H_7-$ | H— | $i\text{-}C_3H_7-$ |
| $4\text{-}HOC_6H_4-$ | $(CH_3)_2CHCH-$ | 2 | H— | H— |  | $-(CH_2)_4-$ |

TABLE—Continued

| Ar | A | n | R₁ | R₄ | R₂ | R₃ |
|---|---|---|---|---|---|---|
| 4-HOC₆H₄— | (CH₃)₂CHCH— | 3 | n-C₃H₇— | H— | H— | CH₃— |
| 4-HOC₆H₄— | CH₃CH— | 3 | H— | | —(CH₂)₂— | H— |
| 4-HOC₆H₄— | —(CH₂)₃— | 3 | C₆H₅CH₂— | H— | H— | H— |
| 4-HOC₆H₄— | CH₃(CH₂)₂CH— | 2 | | —(CH₂)₃— | H— | CH₃— |
| 2-C₄H₃S— | —(CH₂)₃— | 2 | n-C₃H₇— | H— | H— | i-C₃H₇— |
| 2-C₄H₃S— | —(CH₂)₂CH(CH₃)— | 2 | H— | H— | C₆H₅— | C₆H₅— |
| 2-C₄H₃S— | CH₃CH— | 3 | CH₃— | H— | | —(CH₂)₄— |
| 2-C₄H₃S— | CH₃CH— | 2 | CH₃— | H— | | —(CH₂)₄— |
| 2-C₄H₃S— | —(CH₂)₂— | 3 | H— | C₆H₅CH₂— | H— | C₆H₅— |
| 2-C₄H₃S— | —CH(CH₃)CH(CH₃)— | 2 | H— | CH₃— | CH₃— | CH₃— |
| 2-C₄H₃S— | —CH(CH₃)CH(CH₃)— | 2 | H— | H— | H— | C₂H₅— |
| 2-C₄H₃S— | —CH(CH₃)CH(CH₃)— | 3 | H— | H— | H— | s-C₄H₉— |
| 2-C₄H₃S— | CH₃CH— | 3 | H— | H— | H— | t-C₄H₉— |
| 3-C₄H₃S— | CH₃CH— | 3 | H— | C₂H₅— | H— | C₂H₅— |
| 3-C₄H₃S— | —(CH₂)₂— | 2 | H— | H— | i-C₃H₇— | i-C₃H₇— |
| 3-C₄H₃S— | CH₃(CH₂)₂CH— | 2 | H— | H— | C₂H₅— | C₆H₅— |
| 3-C₄H₃S— | —(CH₂)₃— | 3 | H— | C₂H₅— | H— | t-C₃H₇— |
| 3-C₄H₃S— | —(CH₂)₃— | 2 | | —(CH₂)₂— | H— | H— |
| 3-C₄H₃S— | —CH(CH₃)CH₂— | 2 | CH₃— | H— | H— | CH₃— |
| 3-C₄H₃S— | CH₃CH— | 3 | n-C₃H₇— | H— | H— | i-C₃H₇— |
| 3-C₄H₃S— | CH₃CH— | 3 | CH₃— | CH₃— | CH₃— | CH₃— |

EXAMPLE 11

6-[D-2-Phenyl - 2 - (3-guanyl-1-ureidoacetamido)acetamido]penicillanic acid, 3-pivaloyloxymethyl ester Triethylamine (1.4 ml., .01 mole) is added to a solution of 2.5 g. (.005 mole) of D-α-aminobenzylpenicillin-3-pivaloyloxymethyl ester hydrochloride in 50 ml. of dry dimethylformamide and the resulting solution, which is maintained under a nitrogen atmosphere, is cooled to 0° C. in an ice bath and treated with 1.07 g. (.005 mole) of 3-guanyl-1-ureidoacetyl chloride. After stirring the reaction for 30 min. at ice bath temperature, an additional 0.35 ml. (.0025 mole) of triethylamine and 535 mg. (.0025 mole) of the acetyl chloride are added. This procedure is repeated again wherein 0.18 ml. (.0013 mole) of the amine and 278 mg. (.0013 mole) of the acid chloride are added. After stirring for the final 30 min. the reaction mixture is filtered and filtrate poured into the 1.1 l. of diethyl ether. The resulting precipitate is filtered, dissolved in approximately 20 ml. of methylene chloride and reprecipitated with 500 ml. of diethyl ether. Filtration and drying provides the desired product as a white powder, 2.05 g. (81.5% yield).

Infrared spectrum peaks (microns; KBr): 3.0, 3.4, 5.6 (sh), 5.65, 5.75, 5.85–6.3(b), 6.3–6.8(b), 6.85, 7.15, 7.3, 7.7(sh), 7.8, 8.1, 8.3, 8.65, 9.0 and 10.2.

Nuclear magnetic resonance spectrum peaks (PPM; CDCl₃): 1.25(s), 9H; 1.45(d), 6H; 3.15(c), 2H; 4.44(s), 1H; 5.26–6.1(c), 5H; 7.0–7.66(c), 7H; and 7.7–9.2(c), 5H.

EXAMPLE 12

Employing the procedure of Example 11 and starting with the appropriate penicillin ester and requisite guanyl-ureidoalkanoyl chloride, the following compounds are prepared:

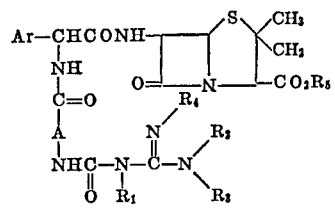

| Ar | A | R₁ | R₄ | R₂ | R₃ | R₅ |
|---|---|---|---|---|---|---|
| C₆H₅— | —CH₂— | H— | H— | H— | H— | CH₃— |
| C₆H₅— | CH₃CH— | H— | H— | n-C₃H₇— | n-C₃H₇— | CH₃— |
| 3—C₄H₃S— | —CH₂— | CH₃— | H— | CH₃— | CH₃— | CH₃— |
| 3—C₄H₃S— | —CH₂— | H— | H— | CH₃— | C₆H₅— | C₂H₅— |
| 2—C₄H₃S— | CH₃(CH₂)₂CH— | CH₃— | H— | —(CH₂)₄— | | C₂H₅— |
| C₆H₅— | —CH₂— | CH₃— | CH₃— | CH₃— | CH₃— | n-C₃H₇— |
| 4—HOC₆H₄— | —CH(CH₃)CH₂— | H— | C₆H₅CH₂— | H— | C₆H₅— | n-C₃H₇— |
| 4—HOC₆H₄— | —CH₂— | H— | H— | CH₃— | CH₃— | n-C₃H₇— |
| 2—C₄H₃S— | —CH₂— | H— | H— | —(CH₂)₅— | | i-C₃H₇— |
| 3—C₄H₃S— | —CH₂CH(CH₃)— | H— | CH₃— | H— | t-C₄H₉— | i-C₃H₇— |
| 3—C₄H₃S— | —(CH₂)₄— | n-C₃H₇— | H— | H— | t-C₃H₇— | i-C₃H₇— |
| C₆H₅— | —CH₂— | H— | H— | H— | H— | CH₃CO₂CH₂— |
| 4—HOC₆H₄— | —CH₂— | H— | H— | H— | H— | CH₃CO₂CH₂— |

TABLE—Continued

| Ar | | | | | | |
|---|---|---|---|---|---|---|
| 2-C₄H₃S— | —CH₂— | H— | H— | H— | CH₃— | CH₃CO₂CH₂— |
| 2-C₄H₃S— | —CH₂— | H— | H— | H— | CH₃— | (CH₃)₂CHCO₂CH₂— |
| C₆H₅— | —(CH₂)₂— | H— | H— | —(CH₂)₅— | | (CH₃)₂CHCO₂CH₂— |
| C₆H₅— | CH₃CH— | H— | H— | C₂H₅— | C₂H₅— | (CH₃)₂CHCO₂CH₂— |
| 4—HOC₆H₄— | —CH₂— | H— | H— | H— | H— | CH₃CO₂CH(CH₃)— |
| 4—HOC₆H₄ | —CH₂CH(CH₃)— | H— | CH₃— | H— | t-C₄H₉— | CH₃CO₂CH(CH₃)— |
| 3—C₄H₃S— | —CH₂— | H— | i-C₃H₇— | H— | i-C₃H₇— | CH₃CO₂CH(CH₃)— |
| 3—C₄H₃S— | —CH₂— | CH₃— | H— | H— | CH₃— | CH₃(CH₂)₂CO₂CH₂— |
| 4—HOC₆H₄— | —(CH₂)₄— | n-C₃H₇— | H— | H— | i-C₃H₇— | CH₃(CH₂)₂CO₂CH₂— |
| C₆H₅— | —CH(CH₃)CH(CH₃)— | —(CH₂)₂— | | —(CH₂)₅— | | CH₃(CH₂)₂CO₂CH₂— |
| C₆H₅— | —CH₂— | H— | H— | CH₃— | CH₃— | (CH₃)₃CCO₂CH₂— |
| 2—C₄H₃S— | —CH₂— | H— | H— | H— | H— | (CH₃)₃CCO₂CH₂— |
| 3—C₄H₃S— | —CH₂— | H— | H— | H— | H— | (CH₃)₃CCO₂CH₂— |
| 4—HOC₆H₄— | —CH₂— | H— | H— | H— | H— | (CH₃)₃CCO₂CH₂— |

EXAMPLE 13

The procedure of Example 1 is again repeated, starting with the appropriate reagents, to provide the following penicillins of the D-configuration.

In a similar manner, the corresponding potassium, calcium, magnesium and other pharmaceutically acceptable metal salts of 6-[D-2-phenyl-2-(3-guanyl-1-ureidoacetamido)acetamido]penicillanic acid and the herein described penicillins are prepared.

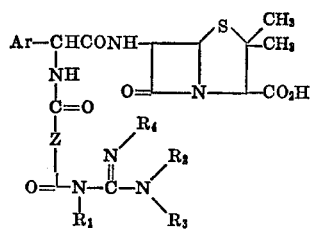

| Ar | Z¹ | R₁ | R₄ | R₂ | R₃ |
|---|---|---|---|---|---|
| C₆H₅— | 1,4-C₆H₄NH— | H— | H— | H— | H— |
| C₆H₅— | 1,3-C₆H₄NH— | H— | H— | H— | H— |
| C₆H₅— | 1,4-CH₂C₆H₄CH₂NH— | H— | CH₃— | H— | CH₃— |
| C₆H₅— | 1,4-CH₂C₆H₄NH— | H— | H— | CH₃— | CH₃— |
| C₆H₅— | —CH[(CH₂)₂]₂N— | H— | H— | H— | H— |
| C₆H₅— | —CH₂CH[(CH₂)₂]₂N— | H— | H— | C₂H₅— | C₂H₅— |
| C₆H₅— | 1,4-C₁₀H₆NH— | H— | H— | —(CH₂)₅— | |
| C₆H₅— | 1,4-CH₂C₁₀H₆NH— | H— | —(CH₂)₄— | | H— |
| C₆H₅— | —CH[(CH₂)₂]₂CHNH— | H— | H— | H— | H— |
| 4-HOC₆H₄— | —CH[(CH₂)₂]₂CHNH— | H— | H— | CH₃— | CH₃— |
| 4-HOC₆H₄— | 1,3-CH₂C₆H₄CH₂NH— | H— | H— | CH₃— | CH₃— |
| 4-HOC₆H₄— | 1,4-C₆H₄CH₂NH— | H— | C₂H₅— | H— | i-C₃H₇— |
| 4-HOC₆H₄— | —CH(CH₂)₂[(CH₂)₃]N— | CH₃— | CH₃— | CH₃— | CH₃— |
| 4-HOC₆H₄— | 1,8-C₁₀H₆NH— | H— | H— | H— | C₆H₅CH₂— |
| 4-HOC₆H₄— | 1,8-C₁₀H₆NH— | H— | C₆H₅— | H— | C₆H₅— |
| 4-HOC₆H₄— | 1,5-CH₂C₁₀H₆CH₂NH— | H— | —(CH₂)₃— | | H— |
| 4-HOC₆H₄— | 1,8-C₁₀H₆CH₂NH— | H— | H— | C₂H₅— | C₂H₅— |
| 4-HOC₆H₄— | —CH[(CH₂)₂]₂N— | CH₃— | H— | —(CH₂)₄— | |
| 2-C₄H₃S— | 1,4-CH₂C₆H₄CH₂NH— | H— | H— | n-C₃H₇— | n-C₃H₇— |
| 2-C₄H₃S— | 1,3-C₆H₄NH— | H— | i-C₃H₇— | H— | i-C₃H₇— |
| 2-C₄H₃S— | 1,4-C₆H₄NH— | H— | C₆H₅CH₂— | H— | C₆H₅— |
| 2-C₄H₃S— | —CH[(CH₂)₂]₂N— | H— | CH₃— | H— | t-C₄H₉— |
| 2-C₄H₃S— | —CH[(CH₂)₂]₂N— | —(CH₂)₃— | | H— | CH₃— |
| 2-C₄H₃S— | —CH[(CH₂)₂]₂N— | C₆H₅CH₂— | H— | H— | H— |
| 2-C₄H₃S— | 1,4-C₆H₄CH₂NH— | H— | H— | H— | i-C₄H₉— |
| 2-C₄H₃S— | —CH(CH₂)[(CH₂)₃]CHNH— | n-C₄H₉— | H— | H— | CH₃— |
| 3-C₄H₃S— | 1,4-C₆H₄CH₂NH— | n-C₄H₉— | H— | H— | CH₃— |
| 3-C₄H₃S— | —CH₂CH[(CH₂)₂]₂NH— | H— | H— | H— | H— |
| 3-C₄H₃S— | —CH[(CH₂)₂]₂CHCH₂NH— | H— | H— | H— | CH₃— |
| 3-C₄H₃S— | 1,4-C₁₀H₆NH— | H— | H— | C₂H₅— | C₂H₅— |
| 3-C₄H₃S— | 1,4-CH₂C₁₀H₆CH₂NH— | H— | H— | —(CH₂)₅— | |
| 3-C₄H₃S— | —CH[(CH₂)₂]₂N— | H— | i-C₃H₇— | H— | i-C₃H₇— |
| 3-C₄H₃S— | —CH₂CH[(CH₂)₂]₂N— | H— | —(CH₂)₂— | | C₂H₅— |
| 3-C₄H₃S— | —CH₂CH[(CH₂)₂]₂N— | n-C₃H₇— | H— | H— | i-C₃H₇— |

¹ In this table, the Z group representing the bridging A group and the amino moiety is written in such a manner that the left bond of the group is attached to the —C(=O)— group one nitrogen removed from the penicillin molecule and the right bond of the group to the —C(=O)— of the urea moiety.

EXAMPLE 14

6-[D-2-Phenyl-2-(3-guanyl-1-ureidoacetamido)acetamido]penicillanic acid sodium salt To a slurry of 30 g. (0.061 mole) of 6-[D-2-phenyl-2-(3-guanyl-1-ureidoacetamido)acetamido]penicillanic acid in 100 ml. of dioxane and 50 ml. of water (cold) is added 5.2 g. (0.061 mole) of sodium bicarbonate dissolved in 75 ml. of water. The partial solution is allowed to stir for 15 min., some insolubles filtered, and the filtrate freeze-dried. The resulting solid is slurried in 2 l. of chloroform, filtered and dried in vacuo, 29.2 g. (93% yield).

EXAMPLE 15

6-[D-2-Phenyl-2-(3-guanyl-1-ureidoacetamido)acetamido]penicillanic acid triethylamine salt A slurry of 2.0 g. (3.8 moles) of 6-[D-2-phenyl-2-(3-guanyl-1-ureidoacetamido)acetamido]penicillanic acid in 20 ml. of water is treated with 0.5 ml. (3.8 mmoles) of triethylamine. After stirring for 5 min., a small amount of insolubles are filtered, and the filtrate is freeze-dried, 2.1 g. (93% yield).

In a similar manner, the ammonium salt and pharmaceutically acceptable salts derived from organic amines for the above described penicillin and the other herein described penicillins are prepared.

EXAMPLE 16

6-[D-2-Phenyl-2-(α-{3-guanyl - 1 - ureido}-β-hydroxypropionamido)acetamido]penicillanic acid (Ar=φ;

n=1; $R_1$, $R_2$, $R_3$ and $R_4$=H)

To 15 ml. of dry dimethylformamide containing 345 mg. (3 mmoles) of N-hydroxysuccinimide and 620 mg. (3 mmoles) of dicyclohexylcarbodiimide is added 676 mg. (3 mmoles) of α-(3-guanyl-1-ureido)-β-hydroxypropionic acid hydrochloride, and the resulting reaction mixture allowed to stir at room temperature for 2 hrs. The mixture is filtered, and 1.35 g. (3 mmoles) of D-α-aminobenzylpenicillin triethylamine salt is added to the filtrate. After stirring for 3 hrs. at room temperature, the mixture is filtered and the filtrate added dropwise to 1.2 l. of diethyl ether. The solids are collected, suspended in 50 ml. of methylene chloride and treated with 1 ml. of triethylamine. After one hr. of stirring, the product is collected and dried in vacuo, 1.18 g. (76% yield).

Infrared spectrum peaks (microns; KBr); 3.10, 5.72, 6.05, 7.18, 7.65 and 8.10.

Nuclear magnetic resonance spectrum peaks; (PPM; $D_2O$); 1.45, (6H); 5.48; 7.48, (5H); and 3.4–4.4(b).

EXAMPLE 17

The procedure of Example 15 is repeated, starting with the appropriate chemical reagents, to provide the following compounds of the DL-configuration:

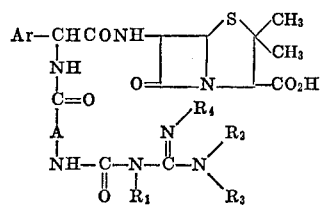

| Ar | A | $R_1$ | $R_4$ | $R_2$ | $R_3$ |
|---|---|---|---|---|---|
| $C_6H_5$— | HOCH$_2$CH— | H— | H— | H— | CH$_3$— |
| $C_6H_5$— | HOCH$_2$CH— | H— | H— | CH$_3$— | CH$_3$— |
| $C_6H_5$— | CH$_3$CHOHCH— | H— | CH$_3$— | H— | CH$_3$— |
| $C_6H_5$— | CH$_3$CHOHCH— | H— | H— | —(CH$_2$)$_5$— | |
| $C_6H_5$— | HSCH$_2$CH— | H— | H— | H— | H— |
| $C_6H_5$— | HSCH$_2$CH— | H— | —(CH$_2$)$_5$— | | H— |
| $C_6H_5$— | HSCH$_2$CH— | H— | CH$_3$— | H— | t-C$_4$H$_9$— |
| $C_6H_5$— | HSCH$_2$CH— | H— | H— | C$_2$H$_5$— | C$_2$H$_5$— |
| $C_6H_5$— | CSH$_3$(CH$_2$)$_2$CH— | H— | H— | H— | H— |
| 4-HOC$_6$H$_4$— | CH$_3$S(CH$_2$)$_2$CH— | H— | C$_2$H$_5$— | H— | C$_2$H$_5$— |
| 4-HOC$_6$H$_4$— | HOCH$_2$CH— | H— | H— | CH$_3$— | CH$_3$— |
| 4-HOC$_6$H$_4$— | HO(CH$_2$)$_2$CH— | H— | H— | H— | H— |
| 4-HOC$_6$H$_4$ | CH$_3$S(CH$_2$)$_2$CH— | CH$_3$— | H— | H— | CH$_3$— |
| 4-HOC$_6$H$_4$ | CH$_3$CHOHCH— | H— | H— | H— | H— |
| 4-HOC$_6$H$_4$— | CH$_3$CHOHCH— | H— | CH$_3$— | CH$_3$— | CH$_3$— |
| 4-HOC$_6$H$_4$ | HSCH$_2$CH— | H— | CH$_3$— | CH$_3$— | CH$_3$— |
| 4-HOC$_6$H$_4$— | HSCH$_2$CH— | | —(CH$_2$)$_5$— | H— | H— |
| 2-C$_4$H$_3$S— | HOCH$_2$CH— | H— | H— | H— | H— |
| 2-C$_4$H$_3$S— | CH$_3$CHOHCH— | H— | H— | CH$_3$— | CH$_3$— |
| 2-C$_4$H$_3$S— | HSCH$_2$CH— | CH$_3$— | CH$_3$— | CH$_3$— | CH$_3$— |
| 2-C$_4$H$_3$S— | CH$_3$SCH$_2$CH— | CH$_3$— | CH$_3$— | CH$_3$— | CH$_3$— |
| 2-C$_4$H$_3$S— | CH$_3$S(CH$_2$)$_2$CH— | H— | H— | H— | H— |
| 2-C$_4$H$_3$S— | HSCH$_2$CH— | H— | —(CH$_2$)$_5$— | | H— |
| 3-C$_4$H$_3$S— | HOCH$_2$CH— | H— | H— | H— | H— |

TABLE—Continued

| | | | | | |
|---|---|---|---|---|---|
| 3-C₄H₃S— | HOCH₂CH— | H— | H— | CH₃— | CH₃— |
| 3-C₄H₃S— | CH₃CHOHCH— | H— | H— | —(CH₂)₅— | |
| 3-C₄H₃S— | CH₃CHOHCH— | H— | —(CH₂)₃— | H— | |
| 3-C₄H₃S— | HSCH₂CH— | H— | CH₃— | H— | CH₃— |
| 3-C₄H₃S— | HSCH₂CH— | H— | CH₃— | CH₃— | CH₃— |
| 3-C₄H₃S— | CH₃S(CH₂)₂CH— | H— | H— | H— | H— |
| 3-C₄H₃S— | CH₃SCH₂CH— | H— | H— | C₆H₅CH₂— | C₆H₅CH₂— |

EXAMPLE 18

6-[D-2-Phenyl-2-(p-{3-guanyl-1-ureido}phenylacetamido)acetamido]penicillanic acid To a solution of 4.5 g. (0.01 mole) of D-α-aminobenzylpenicillin triethylamine salt in 50 ml .of dry dimethylformamide at ice bath temperatures is added 1.75 ml. (0.0125 mole) of triethylamine followed by p-(3-guanyl-1-ureido)phenylacetyl chloride hydrochloride (3.6 g., 0.0125 mole). The resulting suspension is allowed to stir for 1.5 hrs. at <10° C., and is subsequently filtered, and the filtrate added dropwise into a cold solution of 1.4 l. of chloroform and 400 ml. of acetone. The resulting precipitate is filtered and dried in vacuo, 5.78 g.

The infrared and nuclear magnetic spectra are consistent with the structure of the isolated product.

PREPARATION A

Cyanoguanidines

1. The previously known cyanoguanidines of the formula

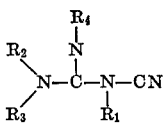

are prepared by the synthetic procedure of the indicated reference as follows:

| R₁ | R₂ | R₃ | R₄ | Reference |
|---|---|---|---|---|
| H— | H— | CH₃— | H— | Kitawaki, Nippon Kagaku Zasshi, 85, 886 (1964). |
| H— | CH₃— | CH₃— | H— | Kitawaki, Nippon Kagaku Zasshi, 85, 886 (1964). |
| H— | CH₃— | CH₃— | CH₃— | Allenstein, Chem. Ber., 100, 2604 (1967). |
| H— | H— | C₂H₅— | H— | Acheson, et al., J. Chem. Soc., 3750 (1958). |
| H— | C₂H₅— | C₂H₅— | H— | British Pat. 599,713. |
| H— | H— | C₂H₅— | C₂H₅— | U.S. Pat. 2,438,124. |
| H— | H— | i-C₃H₇— | H— | British Pat. 599,722. |
| H— | H— | s-C₄H₉— | H— | British Pat. 599,713. |
| H— | H— | CH₃— | CH₃— | U.S. Pat. 2,438,124. |
| H— | n-C₃H₇ | n-C₃H₇— | H— | British Pat. 1,053,307. |
| H— | H— | i-C₃H₇— | C₂H₅— | British Pat. 599,713. |
| H— | H— | CH₃— | C₂H₅— | British Pat. 599,713. |
| H— | H— | H— | t-C₄H₉ | Gadekar, et al., J. Med. Chem., 11, 811 (1968). |
| H— | —(CH₂)₅— | | H— | British Pat. 599,722. |
| H— | H— | i-C₃H₇— | i-C₃H₇— | Birtwell, et al., J. Chem. Soc., 1645 (1948). |
| H— | H— | t-C₄H₉— | CH₃— | Gadekar, et al., J. Med. Chem., 11, 811 (1968) |

2. The following cyanoguanidines, employed as intermediates leading to the products of the present invention and previously unknown in the chemical literature, are synthesized by one or more of the procedures described in the above references:

| R₁ | R₄ | R₂ | R₃ |
|---|---|---|---|
| CH₃— | H— | H— | H— |
| CH₃— | H— | H— | CH₃— |
| C₂H₅ | H— | H— | CH₃— |
| n-C₃H₇— | H— | H— | CH₃— |
| CH₃— | H— | CH₃— | CH₃— |
| n-C₃H₇ | H— | H— | i-C₃H₇— |
| H— | H— | —(CH₂)₄— | |
| CH₃— | CH₃— | CH₃— | CH₃— |
| CH₃— | H— | —(CH₂)₄— | |

PREPARATION B

3-Guanyl-1-nitroureas 1. 3-(N-Methylguanyl)-1-nitrourea

1-Cyano-3-methylguanidine (5.5 g., 0.056 mole) is added slowly in portions to a mixture of 20 ml. of conc. sulfuric acid and 8 ml. of conc. nitric acid at a temperature of 0–10° C. with continuous mechanical stirring. When the addition is complete, the reaction mixture is stirred for 1 hr. at 0° C. and at 20° C. for 2 hrs., and finally added to 200 ml. of ice and water. The precipitate, which formed after several hours, is filtered, washed with acetone, and dried in vacuo, 4.2 g. (47% yield).

The above procedure, which is essentially the method as taught by Frankel, et al., J. Chem. Soc., 2698 (1967), is employed to convert the cyanoguanidines of Preparation A–1 and 2 to the following, previously unreported, 3-guanyl-1-nitroureas, intermediates for the subject compound of the present invention:

| R₁ | R₄ | R₂ | R₃ |
|---|---|---|---|
| H— | H— | CH₃— | CH₃— |
| H— | CH₃— | CH₃— | CH₃— |
| H— | H— | H— | C₂H₅— |
| H— | H— | C₂H₅— | C₂H₅— |
| H— | C₂H₅— | H— | C₂H₅— |
| H— | H— | H— | i-C₃H₇— |
| H— | H— | H— | s-C₄H₉— |
| H— | H— | CH₃— | CH₃— |
| H— | H— | n-C₃H₇— | n-C₃H₇— |
| H— | H— | C₂H₅— | i-C₃H₇— |
| H— | C₂H₅— | H— | CH₃— |
| H— | t-C₄H₉— | H— | H— |
| H— | H— | —(CH₂)₅— | |
| H— | i-C₃H₇— | H— | i-C₃H₇— |
| H— | CH₃— | H— | t-C₄H₉— |
| CH₃— | H— | H— | H— |
| CH₃— | H— | H— | CH₃— |
| C₂H₅— | H— | H— | CH₃— |
| n-C₃H₇— | H— | H— | CH₃— |
| CH₃— | H— | CH₃— | CH₃— |
| n-C₃H₇— | H— | H— | i-C₃H₇— |
| H— | H— | —(CH₂)₄— | |
| CH₃— | H— | CH₃— | CH₃— |
| CH₃— | H— | —(CH₂)₄— | |

PREPARATION C (n=1)

3-Guanyl-1-ureidoalkanoic Acids

1. 3-Guanyl-1-ureidoacetic acid

A mixture of 24.0 g. (320 mmoles) of glycine and 46.8 g. (320 mmoles) of 3-guanyl-1-nitrourea in 960 ml. of water heated and stirred at 100° C. for 1.5 hrs. The reaction mixture, after standing at room temperature overnight, is cooled in an ice bath, and the resulting precipitated product filtered, washed successively with water, ethanol and ether, and dried *in vacuo*, 30.53 g., m.p. 203° C.

a. 3-guanyl-1-ureidoacetyl chloride hydrochloride.—To 300 ml. of dry methylene chloride maintained under a nitrogen atmosphere is added 12.0 g. (0.075 mole) of 3-guanyl-1-ureidoacetic acid and 15.5 g. (0.075 mole) of phosphorous pentachloride and the mixture allowed to stir at room temperature overnight. The product is filtered, washed with dry methylene chloride and dried *in vacuo*, 14.0 g. The infrared spectrum is consistent with the isolated product.

b. 3-guanyl-1-ureidoacetic acid hydrochloride.—A suspension of 1.36 g. of 3-guanyl-1-ureidoacetic acid in 100 ml. of diethyl ether at room temperature is stirred while hydrogen chloride gas is slowly bubbled through the mixture. After fifteen minutes, the addition of gas is stopped and the resulting white powder filtered and dried *in vacuo*, 1.4 g. Infrared spectrum of the product is consistent with complete conversion to the hydrochloride salt.

2. Following the procedure of Preparation C–1, which is essentially that as taught by Frankel, *et al.*, *J. Chem. Soc.*, 2698 (1967), and starting with the requisite aminoacids and 3-guanyl-1-nitroureas from Preparations B–1 and B–2, the following intermediates are prepared:

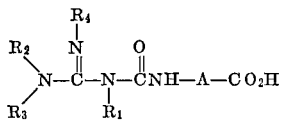

| $R_1$ | $R_4$ | $R_2$ | $R_3$ | A |
|---|---|---|---|---|
| H— | H— | H— | H— | —(CH$_2$)$_2$— |
| H— | H— | H— | H— | —(CH$_2$)$_3$— |
| H— | H— | H— | H— | —CH(CH$_3$)CH$_2$— |
| H— | H— | H— | H— | —CH$_2$CH(CH$_3$)— |
| H— | H— | H— | H— | —CH(CH$_3$)CH(CH$_3$)— |
| H— | H— | H— | H— | —CH$_2$CH(CH$_3$)CH$_2$— |
| H— | H— | H— | H— | CH$_3$ĊH— |
| H— | H— | H— | H— | (CH$_3$)$_2$CHĊH— |
| H— | H— | H— | H— | CH$_3$(CH$_2$)$_2$ĊH— |
| H— | H— | H— | H— | —(CH$_2$)$_4$— |
| CH$_3$— | H— | CH$_3$— | CH$_3$— | —CH$_2$— |
| H— | CH$_3$— | CH$_3$— | CH$_3$— | —CH$_2$— |
| H— | H— | H— | C$_2$H$_5$— | —CH$_2$— |
| H— | H— | H— | C$_2$H$_5$— | —CH$_2$— |
| H— | C$_2$H$_5$— | H— | C$_2$H$_5$— | —CH$_2$— |
| CH$_3$— | C$_2$H$_5$— | H— | CH$_3$— | —CH$_2$— |
| H— | C$_2$H$_5$— | H— | i-C$_3$H$_7$— | —CH$_2$— |
| H— | C$_2$H$_5$— | H— | s-C$_4$H$_9$— | —CH$_2$— |
| H— | H— | n-C$_3$H$_7$— | n-C$_3$H$_7$— | —CH$_2$— |
| H— | C$_2$H$_5$— | H— | i-C$_3$H$_7$ | —CH$_2$— |
| H— | C$_2$H$_5$— | H— | CH$_3$— | —CH$_2$— |
| C$_2$H$_5$— | H— | CH$_3$— | CH$_3$— | —CH$_2$— |
| H— | H— | H— | t-C$_4$H$_9$— | —CH$_2$— |
| H— | H— | H— | —(CH$_2$)$_5$— | —CH$_2$— |
| n-C$_3$H$_7$— | H— | H— | CH$_3$— | —CH$_2$— |
| CH$_3$— | H— | CH$_3$— | CH$_3$— | —CH$_2$— |
| n-C$_3$H$_7$— | H— | H— | i-C$_3$H$_7$— | —CH$_2$— |
| H— | t-C$_3$H$_7$— | H— | i-C$_3$H$_7$— | —CH$_2$— |
| H— | t-C$_4$H$_9$— | H— | CH$_3$— | —CH$_2$— |
| H— | H— | —(CH$_2$)$_4$— | | —CH$_2$— |
| H— | H— | H— | CH$_3$— | —(CH$_2$)$_2$— |
| H— | H— | n-C$_3$H$_7$— | n-C$_3$H$_7$ | CH$_3$ĊH— |
| H— | CH$_3$— | CH$_3$— | CH$_3$— | —CH(CH$_3$)CH$_2$— |
| H— | H— | H— | t-C$_4$H$_9$ | —(CH$_2$)$_3$— |
| H— | H— | —(CH$_2$)$_5$— | | —C(CH$_3$)$_2$CH$_2$— |
| H— | i-C$_3$H$_7$— | H— | i-C$_3$H$_7$— | CH$_3$ĊH— |

TABLE—Continued

| $R_1$ | $R_4$ | $R_2$ | $R_3$ | A |
|---|---|---|---|---|
| H— | H— | H— | i-C$_4$H$_9$— | CH$_3$(CH$_2$)$_2$ĊH— |
| H— | CH$_3$— | H— | t-C$_4$H$_9$— | —CH$_2$CH(CH$_3$)— |
| n-C$_3$H$_7$— | H— | H— | i-C$_3$H$_7$— | —(CH$_2$)$_4$— |
| H— | H— | —(CH$_2$)$_4$— | | —(CH$_2$)$_2$— |
| CH$_3$— | CH$_3$— | CH$_3$— | CH$_3$— | —CH$_2$— |
| H— | H— | CH$_3$— | CH$_3$— | —(CH$_2$)$_2$— |
| CH$_3$— | H— | H— | | CH$_3$(CH$_2$)$_2$ĊH— |
| H— | H— | C$_2$H$_5$— | C$_2$H$_5$— | CH$_3$ĊH— |
| H— | C$_2$H$_5$— | H— | C$_2$H$_5$ | CH$_3$ĊH— |
| H— | H— | H— | t-C$_4$H$_9$— | CH$_3$ĊH— |
| H— | CH$_3$— | CH$_3$— | CH$_3$— | —(CH$_2$)$_4$— |
| H— | H— | —(CH$_2$)$_5$— | | CH$_3$(CH$_2$)$_2$ĊH— |
| H— | H— | H— | i-C$_4$H$_9$— | —CH$_2$— |
| n-C$_4$H$_9$— | H— | H— | CH$_3$— | —CH(CH$_3$)CH$_2$— |
| H— | i-C$_3$H$_7$— | H— | i-C$_3$H$_7$— | —(CH$_2$)$_2$— |

3. 3-(N-Phenylguanyl)-1-ureidoacetic acid hydrochloride

To 50 ml. of benzene containing 6.75 g. (0.05 mole) of N-phenylguanidine is added in portions 6.45 g. (0.05 mole) of ethyl isocyanatoacetate and the resulting solution heated to reflux for 3 hrs. The reaction mixture is cooled and the solvent removed *in vacuo*.

The residual intermediate, ethyl 3-(N-phenylguanyl)-1-ureidoacetate is treated with 200 ml. of concentrated hydrochloric acid and the resulting solution heated at steam bath temperature for 1–2 hrs. The mixture is concentrated to dryness under reduced pressure, and the product recrystallized from a small amount of water.

4. Starting with the appropriate guanidine and requisite isocyanatoalkanoate, prepared from the corresponding aminoacid ester hydrochloride and phosgene according to the method of Humphlett, *et al.*, *J. Org. Chem.*, 26, 2507 (1961), and employing the procedure of Preparation C–3, the following intermediates are synthesized:

$$R_2\diagdown\underset{R_3}{N}-\overset{R_4}{\underset{|}{N}}-\overset{O}{\overset{\|}{C}}-NH-A-CO_2H$$

| $R_1$ | $R_2$ | $R_3$ | $R_4$ | A |
|---|---|---|---|---|
| H— | H— | C$_6$H$_5$— | C$_2$H$_5$— | —CH$_2$— |
| H— | C$_6$H$_5$— | C$_6$H$_5$— | H— | —CH$_2$— |
| H— | C$_2$H$_5$— | C$_6$H$_5$— | H— | —CH$_2$— |
| H— | H— | C$_6$H$_5$— | H— | —(CH$_2$)$_2$— |
| H— | H— | C$_6$H$_5$— | C$_6$H$_5$— | —CH$_2$CH(CH$_3$)CH$_2$— |
| H— | H— | C$_6$H$_5$— | H— | CH$_3$ĊH— |
| H— | C$_6$H$_5$— | C$_6$H$_5$ | H— | —CH(CH$_3$)CH$_2$— |
| H— | C$_6$H$_5$— | C$_2$H$_5$— | H— | —CH(CH$_3$)CH(CH$_3$)— |
| H— | H— | C$_6$H$_5$— | C$_6$H$_5$— | (CH$_3$)$_2$CHĊH— |

5. 1-(N-Carboxymethylcarbamyl)-2-amino-2-imidazoline hydrochloride a. 1 - (N-Ethoxycarbonylmethylcarbamyl)-2-mercapto-2-imidazoline.—A mixture of 20.4 g. (0.2 mole) of 2-mercapto-2-imidazoline and 25.82 g. (0.2 mole) of ethyl isocyanatoacetate is heated to 100° C. under nitrogen for 12 hrs., at which time the mixture solidifies. The temperature is maintained for an additional 30 min., and the mixture is then cooled, triturated with acetone, filtered and dried *in vacuo*.

b. 1 - (N-Carboxymethylcarbamyl)-2-mercapto-2-imidazoline.—A suspension of 11.32 g. (0.049 mole) of the above ester in 29.6 ml. of 2N sodium hydroxide solution is stirred at room temperature until the solids are dissolved (~2 hrs.). The solution is filtered and the filtrate acidified with 6N hydrochloric acid to pH 2. The resulting precipitate is filtered, washed with a small volume of water and dried *in vacuo* over phosphorous pentoxide.

c. 1-(N-Carboxymethylcarbamyl)-2-methylthio-2-imidazoline hydroiodide.—A suspension of 7.1 g. of the above acid and 3.2 ml. of methyl iodide in 60 ml. of acetone is allowed to stir at room temperature overnight during which time the starting materials gradually dissolve and the product precipitates. The mixture is poured into 150 ml. of ethyl ether and the solids are collected and dried *in vacuo*.

d. 1 - (N-Carboxymethylcarbamyl)-2-amino-2-imidazoline.—An ethanol (22 ml.) solution containing 3.04 g. (8.8 mmoles) of the above isothiouronium salt is treated with ammonia gas introduced below the surface of the solution employing a gas dispersion tube. After 15–20 min. the addition is stopped and the reaction mixture allowed to stir at room temperature overnight. The resulting precipitate is filtered, washed with ethanol, then ether and dried *in vacuo*.

6. Starting with the requisite thiourea derivative and isocyanatoalkanoate, and repeating the general sequence of reaction in Preparation C–5a through C–5d, the following intermediate guanylureidoalkanoic acid congeners are synthesized:

$$R_2\diagdown_{R_3}N-\overset{\overset{R_4}{|}}{\underset{\underset{R_1}{|}}{C}}-N-\overset{\overset{O}{\|}}{C}-NH-A-CO_2H$$

| $R_1$ | $R_4$ | $R_2$ | $R_3$ | A |
|---|---|---|---|---|
| —(CH$_2$)$_3$— | | H— | H— | —CH$_2$— |
| —(CH$_2$)$_2$— | | —(CH$_2$)$_5$— | | —CH(CH$_3$)CH(CH$_3$)— |
| —(CH$_2$)$_3$— | H— | | CH$_3$— | —CH$_2$— |

7. 1-N-Benzylguanyl)-3-ureidoacetic acid.

a. 1 - (N-Ethoxycarbonylmethylcarbamyl)thiourea.—A mixture of 26.6 g. (0.205 mole) of ethyl isocyanatoacetate and 15.8 g. (0.2 mole) of thiourea is heated to 100° C. for 35 min. under a nitrogen atmosphere, followed by cooling and trituration of the solids with acetone. The product is filtered and dried *in vacuo*, 13.9 g.

b. 1-(N-Carboxymethylcarbamyl)thiourea.—A suspension of 10.12 g. (.05 mole) of the above ester in 30 ml. of 2N sodium hydroxide solution is stirred at room temperature until most of the solids are dissolved. The mixture is filtered and the filtrate acidified to pH 2.0. The resulting precipitate is filtered, washed with a small amount of water and dried *in vacuo* over phosphorous pentoxide, 6.5 g.

c. 1 - N-(Carboxymethylcarbamyl)-S-methylisothiourea hydroiodide.—An acetone (60 ml.) solution of 6.37 g. of the above acid is treated with 3.2 ml. of methyl iodide and the solids, which gradually dissolved, are allowed to stir at room temperature overnight. The suspension is poured into 150 ml. of ethyl ether, and the product is filtered and dried, 11.0 g.

d. 1 - (N-Benzylguanyl)-3-ureido acetic acid.—Two and eight-tenths grams (8.8 mmoles) of the S-methylthiourea above is dissolved in 25 ml. of ethanol and treated with 3.18 ml. (29 mmoles) of benzylamine. After several hours at room temperature a white percipitate commences to form. After stirring overnight at room temperature the product is filtered, washed with ethanol, then ether and dried *in vacuo*, 2.0 g.

8. Starting with the appropriately substituted thiourea and isocyanatoalkanoate, and repeating the procedure of Preparation C–7a through C–7d, the following intermediates are prepared:

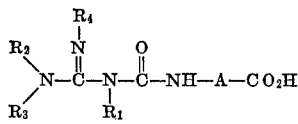

| $R_1$ | $R_2$ | $R_3$ | $R_4$ | A |
|---|---|---|---|---|
| H— | H— | C$_6$H$_5$CH$_2$— | C$_2$H$_5$— | —CH$_2$— |
| H— | CH$_3$— | C$_6$H$_5$CH$_2$— | H— | —CH$_2$— |
| H— | C$_6$H$_5$CH$_2$— | C$_6$H$_5$CH$_2$— | H— | —CH$_2$— |
| H— | CH$_3$— | C$_6$H$_5$CH$_2$— | H— | (CH$_3$)$_2$CHCH— |
| H— | H— | C$_6$H$_5$CH$_2$— | C$_6$H$_5$— | —CH(CH$_3$)CH$_2$— |
| H— | H— | C$_6$H$_5$CH$_2$— | H— | —CH(CH$_3$)CH$_2$— |

9. 1-(2-Imidazolinyl)-3-carboxymethylurea a. 1-(Ethoxycarbonylmethyl)-3-cyanourea.—To a partial suspension of sodium cyanamide formed from 4.2 g. (0.1 mole) of cyanamide and an equivalent amount of sodium hydride in 35 ml. of dry dimethylformamide is added 12.9 g. (0.1 mole) of ethyl isocyanatoacetate dropwise. The reaction is maintained at room temperature for several hours, after which the mixture is poured into water, the pH adjusted to 5, and the product extracted with methylene chloride. The solvent layer is dried over sodium sulfate and concentrated to dryness, the product being employed in the next reaction without further purification.

b. 1-(Ethoxycarbonylmethyl)-3-thiocarbamylurea.—A solution of 12.8 g. (0.075 mole) of the above ester in 50 ml. of ethanol is saturated with hydrogen sulfide gas and the solution heated to 50–60° C. for 3.5 hrs. The solvent is removed under reduced pressure and the residual product crystallized from methanol.

c. 1 - (Carboxymethyl) - 3-thiocarbamylurea.—Twenty and five-tenths grams (0.1 mole) of the above ester is added to 60 ml. of 2N sodium hydroxide solution and the mixture allowed to stir at room temperature until most of the material has dissolved. The suspension is filtered and the filtrate acidified to pH 2. The resulting product is filtered, washed with 10 ml. of water and dried *in vacuo*.

d. 1-(N-Carboxymethylcarbamyl)-S-methylisothiourea hydroiodide.—Acetone (60 ml.) is charged with 8.9 g. (0.05 mole) of the above acid followed by the addition of 3.8 ml. of methyl ioide and the mixture allowed to stir at room temperature overnight. The precipitated product is filtered, washed several times with ether and air dried.

e. 1 - (2-Imidazolinyl) - 3 - (carboxymethyl)urea.—To 18.6 g. (0.1 mole) of the above isothiourea in 150 ml. of ethanol is added 12.0 g. (0.2 mole) of ethylenediamine and the reaction mixture warmed to 50–60° C. for several hours and then allowed to stir at room temperature overnight. The product, which precipitates from solution is filtered and recrystallized several times from methanol.

10. Employing the procedure of Preparation C–9a through C–9e and starting with the appropriate reagents, the following guanylureidoalkanoic acids are synthesized:

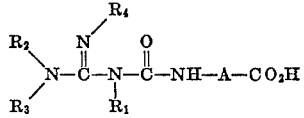

| $R_1$ | $R_4$ | $R_2$ | $R_3$ | A |
|---|---|---|---|---|
| H— | —(CH$_2$)$_3$— | | H— | —CH$_2$— |
| H— | —(CH$_2$)$_3$— | | H— | —CH$_2$CH(CH$_3$)CH$_2$— |
| C$_6$H$_5$CH$_2$— | H— | H— | H— | —CH$_2$— |
| H— | —(CH$_2$)$_2$— | | C$_2$H$_5$— | —CH$_2$CH(CH$_3$)CH$_2$— | a. In a manner similar to the procedure of Preparation C–1a, the 3-guanyl-1-ureidoalkanoic acids of Preparations C–2 through C–10, on treatment with phosphorous pentachloride, are converted to the corresponding 3-guanyl-1-ureidoalkanoyl chloride hydrochlorides which are employed as intermediates for the herein disclosed products.

3. Starting with the appropriate di- or tripeptide and requisite 3-guanyl-1-nitrourea, and employing the procedure of Preparation D–1 and 2, the following intermediates are prepared:

$$\underset{R_3}{\overset{R_2}{>}}N-\overset{R_4}{\underset{\|}{C}}-N-\overset{O}{\underset{\|}{C}}-[-NH-A-CO]_nOH$$
$$\phantom{xxxxxxxxx}R_1$$

| A | n | R₁ | R₄ | R₂ | R₃ |
|---|---|---|---|---|---|
| —(CH₂)₂— | 2 | H— | H— | H— | H— |
| —(CH₂)₂— | 3 | H— | H— | H— | H— |
| —CH(CH₃)CH₂— | 2 | H— | H— | H— | CH₃— |
| CH₃CH— | 2 | H— | H— | n-C₃H₇— | n-C₃H₇— |
| CH₃CH— | 3 | H— | C₂H₅ | H— | C₂H₅— |
| —CH(CH₃)CH(CH₃)— | 2 | H— | CH₃— | CH₃— | CH₃— |
| —(CH₂)₂— | 2 | C₂H₅ | H— | H— | CH₃— |
| CH₃CH₂CH— | 2 | H— | t-C₄H₉ | H— | CH₃— |
| —CH₂CH(CH₃)— | 3 | H— | i-C₃H₇ | H— | i-C₃H₇— |
| (CH₃)₂CHCH— | 2 | H— | H— | —(CH₂)₄— | |
| (CH₃)₂CHCH— | 3 | n-C₃H₇— | H— | H— | CH₃— |
| —(CH₂)₃— | 2 | n-C₃H₇— | H— | H— | t-C₃H₇— |
| CH₃CH— | 3 | CH₃— | H— | (CH₂)₄— | |
| CH₃CH— | 2 | CH₃— | H— | (CH₂)₄— | |
| —CH(CH₃)CH(CH₃)— | 2 | H— | CH₃— | CH₃— | CH₃— |
| —CH(CH₃)CH(CH₃)— | 2 | H— | H— | H— | C₂H₅— |
| —CH(CH₃)CH(CH₃)— | 3 | H— | H— | H— | s-C₄H₉— |
| CH₃CH— | 3 | H— | H— | H— | t-C₄H₉— |
| CH₃CH— | 3 | H— | C₂H₅— | H— | C₃H₅— |
| —(CH₂)₃— | 2 | H— | H— | i-C₃H₇— | i-C₃H₇— |
| —(CH₂)₃— | 3 | H— | C₂H₅— | H— | i-C₃H₇— |
| —CH(CH₃)CH₂— | 2 | CH₃— | H— | H— | CH₃— |
| CH₃CH— | 3 | n-C₃H₇— | H— | H— | i-C₃H₇— |
| CH₃CH— | 3 | CH₃— | CH₃— | CH₃— | CH₃— |

PREPARATION D

3-Guanyl-1-ureidoalkanoic acids (n=2 or 3)

1. 3-Guanyl-1-ureidoacetylglycine hydrochloride

A mixture of 1.32 g. (10 mmoles) of glycylglycine and 1.47 g. (10 mmoles) of 3-guanyl-1-nitrourea in 15 ml. of water is heated to reflux overnight. The reaction mixture is cooled, and the solids filtered and dried *in vacuo*, 875 mg. The infrared spectrum of the product is consistent with the assigned structure.

To a suspension of the above compound in 5 ml. of diethyl ether is added *via* a gas dispersion tube dry hydrogen chloride gas. After 30 min. the gas addition is stopped and the precipitate allowed to stir for 3 hrs. The product is filtered under nitrogen and dried *in vacuo*.

2. 3-Guanyl-1-ureidoacetylglycylglycine hydrochloride

In a manner similar to Preparation D–1, 1.87 g. (0.01 mole) of glycylglycylglycine and 1.47 g. (0.01 mole) of 3-guanyl-1-nitrourea in 15 ml. of water yields, on treatment with hydrogen chloride gas, 311 mg. of the desired product.

4. β-(β-[3-{N-Benzyl-N′-phenylguanyl}-1-ureido]propionoyl)alanine

To a partial suspension of 1.9 g. (0.01 mole) of β-alanine triethylamine salt in 25 ml. of dry dimethylformamide at room temperature, under a nitrogen atmosphere and cooled to 0° C. in an ice bath is added 1 g. (0.01 mole) of triethylamine followed by the portionwise addition of 3.95 g. (0.01 mole) of 3-(N-benzyl-N′-phenylguanyl)-1-ureidopropionyl chloride hydrochloride. The mixture is stirred vigorously for 1–2 hrs., and is then allowed to warm to room temperature. The mixture is filtered, and the filtrate added to 150 ml. of diethyl ether. The resulting precipitate is filtered, reslurried in a small volume of water, refiltered and dried *in vacuo*.

5. Employing the general procedure of Preparation D–4 and starting with the appropriate guanylureidoalkanoyl chloride and amino acid or dipeptide, the following intermediates are prepared:

$$\begin{array}{c} R_4 \\ | \\ R_2 \quad N \quad O \\ \diagdown \quad \| \quad \| \\ N-C-N-C-[-NH-A-CO]_nOH \\ \diagup \quad | \\ R_3 \quad R_1 \end{array}$$

| A | n | $R_1$ | $R_4$ | $R_2$ | $R_3$ |
|---|---|---|---|---|---|
| $-(CH_2)_4-$ | 2 | H— | H— | $C_6H_5CH_2-$ | $CH_2-$ |
| $-(CH_2)_2-$ | 3 | | $-(CH_2)_2-$ | | $-(CH_2)_5-$ |
| $-(CH_2)_2-$ | 2 | H— | | $-(CH_2)_3-$ | H— |
| $CH_3CH_2\overset{|}{C}H-$ | 2 | H— | H— | $C_6H_5CH_2-$ | $C_6H_5CH_2-$ |
| $CH_3\overset{|}{C}H-$ | 3 | H— | | $-(CH_2)_2-$ | H— |
| $-(CH_2)_3-$ | 2 | $C_6H_5CH_2-$ | H— | H— | H— |
| $CH_3(CH_2)_2\overset{|}{C}H-$ | 2 | | $-(CH_2)_3-$ | H— | $CH_3-$ |
| $-(CH_2)_2CH(CH_3)-$ | 2 | H— | H— | $C_6H_5$ | $C_6H_5-$ |
| $-(CH_2)_2-$ | 3 | H— | $C_6H_5CH_2-$ | H— | $C_6H_5-$ |
| $CH_3(CH_2)_2\overset{|}{C}H-$ | 2 | H— | H— | $C_2H_5-$ | $C_6H_5-$ |
| $-(CH_2)_3-$ | 2 | | $-(CH_2)_2-$ | H— | H— |

PREPARATION E

Amino Acids and Di- and Tripeptides

1. The amino acids and peptides employed as intermediates leading to the products of the present invention are either commercial reagents or are prepared according to literature procedures well known to those skilled in the art, for example, according to the synthetic routes as taught by Greenstein and Winitz in "Chemistry of the Amino Acids," John Wiley & Sons, Inc., New York, N.Y., 1961, Vols. 1, 2 and 3.

What is claimed is:

1. A compound selected from those of the formula:

$$\begin{array}{c} \text{Ar—CHCONH} \diagdown \overset{S}{\diagup} \diagup CH_3 \\ | \qquad \qquad \diagdown \diagup \diagdown CH_3 \\ NH \qquad \quad O= \quad N \quad -CO_2H \\ | \\ [-C=O-] \\ | \quad A \\ | \\ NH \quad ]_n \quad R_4 \\ \quad \quad \quad | \\ \quad \quad \quad N \diagdown R_2 \\ O=C-N-C-N \\ | \quad \quad | \\ R_1 \quad R_3 \end{array}$$

and the pharmaceutically acceptable salts thereof, wherein Ar is selected from the group consisting of phenyl, 4-hydroxyphenyl, 2-thienyl and 3-thienyl;
A is selected from the group consisting of alkylene containing from 1 to 4 carbon atoms and alkylidene containing from 2 to 4 carbon atoms;
n is an integer of 1 to 3;
$R_1$, $R_2$, $R_3$ and $R_4$ when considered separately are each selected from the group consisting of hydrogen and alkyl containing from 1 to 4 carbon atoms;
$R_1$ and $R_4$ when considered together are alkylene containing from 2 to 4 carbon atoms;
$R_2$ and $R_4$ when considered together are alkylene containing from 2 to 4 carbon atoms; and
$R_2$ and $R_3$ when considered together are alkylene containing from 4 to 5 carbon atoms.

2. A compound of claim 1 having the D configuration.

3. A compound of claim 2 wherein Ar is phenyl, n is 1, A is selected from the group consisting of alkylene containing from 1 to 4 carbon atoms and alkylidene containing from 2 to 4 carbon atoms, and $R_1$, $R_3$ and $R_4$ are each hydrogen.

4. The compound of claim 3 wherein A is —$CH_2$— and $R_2$ is $CH_3$—.

5. The compound of claim 3 wherein A is —$CH_2$— and $R_2$ is hydrogen.

6. The compound of claim 3 wherein A is —$CH_2CH_2$— and $R_2$ is hydrogen.

7. A compound of claim 2 wherein n is 1, A is alkylene containing from 1 to 4 carbon atoms and $R_1$, $R_2$, $R_3$ and $R_4$ are each hydrogen.

8. The compound of claim 7 wherein Ar is 2-thienyl and A is —$CH_2$—.

9. A compound of claim 2 wherein Ar is phenyl, A is alkylene containing from 1 to 4 carbon atoms and $R_1$, $R_2$, $R_3$ and $R_4$ are each hydrogen.

10. The compound of claim 9 wherein n is 2 and A is —$CH_2$—.

11. The compound of claim 9 wherein n is 3 and A is —$CH_2$—.

References Cited

UNITED STATES PATENTS

| 3,579,501 | 5/1971 | McGregor | 260—239.1 |
| 3,483,188 | 12/1969 | McGregor | 260—239.1 |

N. S. RIZZO, Primary Examiner

U.S. Cl. X.R.

424—271